United States Patent [19]

Nordenstam

[11] Patent Number: 5,539,661
[45] Date of Patent: Jul. 23, 1996

[54] METHOD OF DIVIDING THE FUNCTION OF A DEVICE INTO A NUMBER OF SUBFUNCTIONS

[75] Inventor: Jan O. Nordenstam, Haninge, Sweden

[73] Assignee: Telefonaktiebolaget LM Ericsson, Stockholm, Sweden

[21] Appl. No.: 156,648

[22] Filed: Nov. 24, 1993

[30] Foreign Application Priority Data

Nov. 26, 1992 [SE] Sweden .................................. 9203568

[51] Int. Cl.$^6$ ...................................................... H04M 9/06
[52] U.S. Cl. ..................................... 364/514 R; 379/355
[58] Field of Search .............................. 364/514, 514 C; 379/201, 280, 355, 200, 212, 211, 216, 209; 395/650, 700, 909, 325

[56] References Cited

U.S. PATENT DOCUMENTS

| | | | |
|---|---|---|---|
| 4,893,335 | 1/1990 | Fuller et al. ............................. | 379/200 |
| 4,928,304 | 5/1990 | Sakai . | |
| 5,323,452 | 6/1994 | Dickman et al. ........................ | 379/201 |
| 5,386,464 | 1/1995 | Pruitt ...................................... | 379/201 |

OTHER PUBLICATIONS

Abramowski et al., "A Service Creation Environment for Intelligent Networks", International Zürich Seminar on Digital Communications, pp. 147–163 (Mar. 1992).

Primary Examiner—Emanuel T. Voeltz
Assistant Examiner—Thomas Peeso
Attorney, Agent, or Firm—Burns, Doane, Swecker & Mathis

[57] ABSTRACT

The invention relates to a method and a control system (15) allowing devices, which are provided with different sets of sub-functions (A, B, C, D, B*C) on different markets, to be complemented with new sub-functions which are structured like modules that fit into all existing devices. This is accomplished by structuring the device into sub-functions selected in accordance with the inventive method, the sub-functions in turn being structured into partial-states and analyses results. The invention sets out rules for how sub-functions may refer to each other, the rules being based upon an analyses of logical dependencies existing between the sub-functions of a device. A structured sub-function is similar to a module that fits into any structured device provided the identified logical dependencies are not violated. A sub-function may modify and complement other sub-functions to which it, in accordance with the rules, is allowed to refer. The invention solves the problem of interaction between sub-functions (B*C). The control system (15) provides for a unitary interface (16) by which a modular sub-function can be added to or removed from an existing device (3). In the preferred embodiment of the invention the device is a program controlled telecommunication device.

33 Claims, 25 Drawing Sheets

Logical dependencies

B → A
C → A
D → B
B ∩ C → B*C
B*C → B
B*C → C

Graph

Potentially possible devices

A
AB
AC
ABC  B*C
ABD
ABCD  B*C

|  | Logical dependencies | Graph | Potentially possible devices |
|---|---|---|---|
| 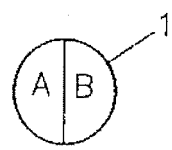<br>Fig 1 | B → A | | A<br>AB |
| 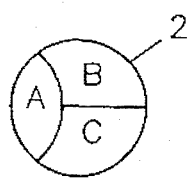<br>Fig 2 | B → A<br>C → A | 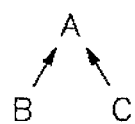 | A<br>AB<br>AC<br>ABC |
| 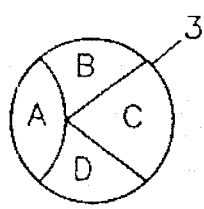<br>Fig 3 | B → A<br>C → A<br>D → B | 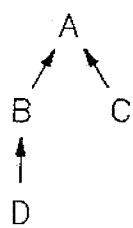 | A<br>AB<br>AC<br>ABC<br>ABD<br>ABCD |
| 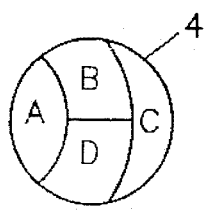<br>Fig 4 | B → A<br>C → A<br>D → B ∩ C | 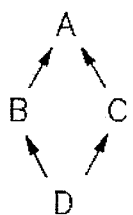 | A<br>AB<br>AC<br>ABC<br>ABCD |

|   | Logical dependencies | Graph | Potentially possible devices |
|---|---|---|---|
| 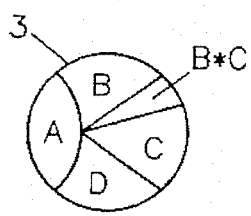 Fig 8 | B → A<br>C → A<br>D → B<br>B ∩ C → B∗C<br>B∗C → B<br>B∗C → C | 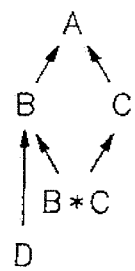 | A<br>AB<br>AC<br>ABC   B∗C<br>ABD<br>ABCD  B∗C |
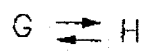
Fig 5
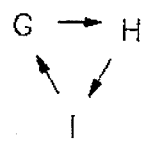
Fig 6
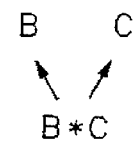
Fig 7

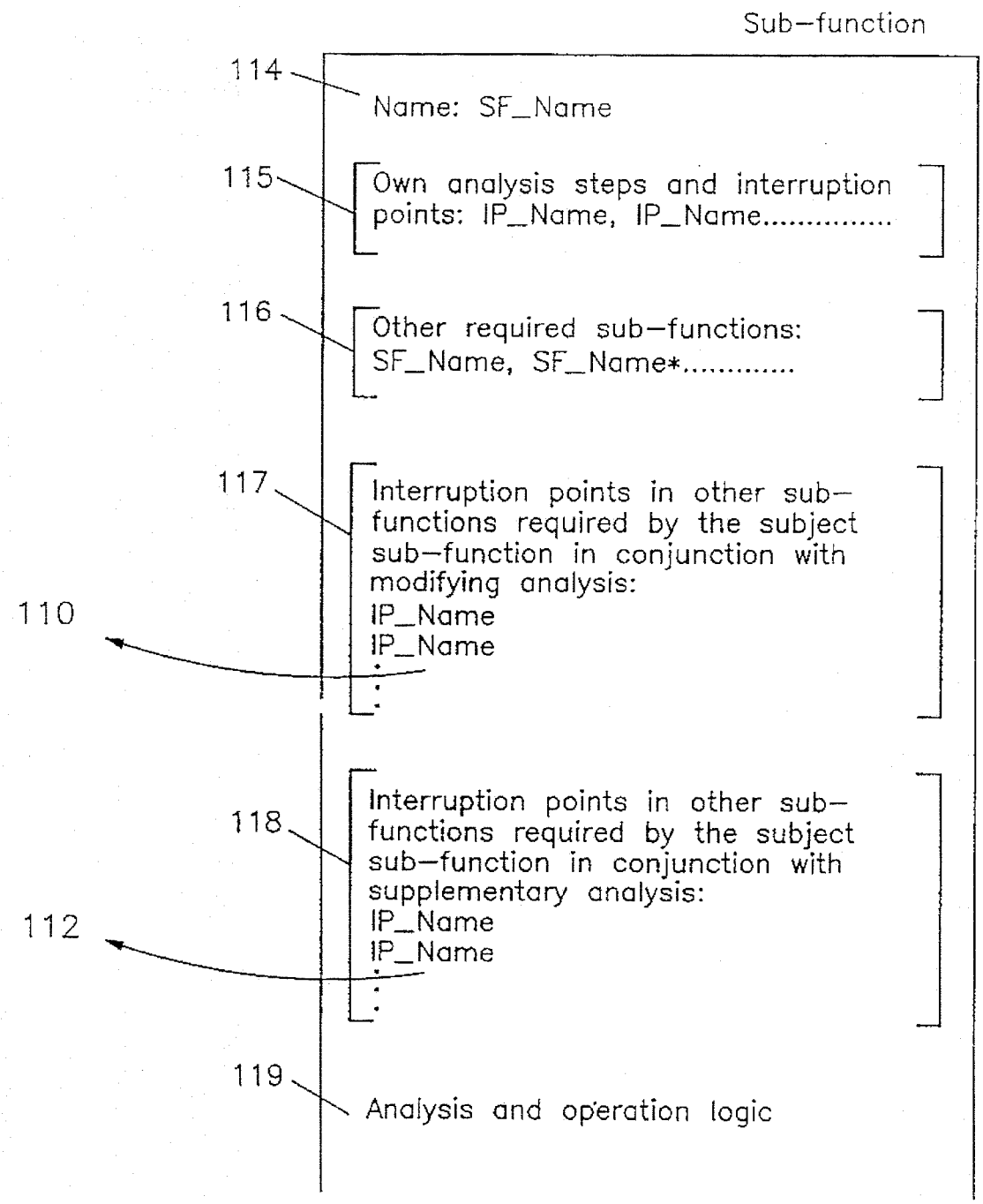
Fig 18    *The name of the interacting functions
         if interaction functions are concerned

METHOD OF DIVIDING THE FUNCTION OF A DEVICE INTO A NUMBER OF SUBFUNCTIONS

TECHNICAL FIELD

The term "device" as used in the following text refers preferably to a telecommunication device, although the invention is not limited to such a device.

A device of the aforesaid kind will operate in a specific manner, hereinafter referred to as the operating function of the device, or simply the function of the device. A function can be divided into sub-functions. Examples of the sub-functions of a telecommunication device are subscriber services, statistic services, billing services. Examples of subscriber services are abbreviated numbers, diversion follow-me calls, conference calls, diversion-on-busy calls. Toll-ticketing is an example of billing services.

The function of a device of this kind can be described with the aid of a state machine, which is known, among other things, from the field of data technology referred to as formal language theory. See for instance V. J. Rayward-Smith, "A first course in formal language theory", Blackwell Scientific Publications, 1983. A state machine describes the function of a device in terms of states and external stimuli. A table is setup which describes each combination of states and external stimuli. For each such combination, the table also discloses the new state the machine shall take in response to an external stimulus. At times, the current or relevant combination of external stimulus and state will not result in a state transition and the machine retains the old state. If the known state machine is to be used as a model for describing the function of a device of the type with which the invention is concerned, the model will need to be supplemented in a known manner with the output signal or output signals that are produced by the state machine for each combination of external stimulus and state. A model of this kind is a simplified model of reality and, for instance, fails to describe those procedures which effect the state changes.

One object of the present invention is to allow devices that are provided with different sets of sub-functions, on different markets for instance, to be supplemented with new sub-functions. More specifically, the invention is intended to enable the addition of existing sub-functions to, and to enable removal of existing sub-functions from, a device, and to enable the design of completely new sub-functions for existing devices. A sub-function which can be added to and removed from a device is said in the following to be an optional sub-function.

Devices of the aforesaid kind are often highly complex, due to the requirement for optional sub-functions and also due to the need to be able to supplement the device with new sub-functions that did not earlier exist.

Devices of this kind may or may not be program-controlled. The invention, however, is not restricted to program-controlled devices.

More specifically, the invention relates to a method of dividing the function of a device, preferably the function of a program controlled telecommunication device into a number of sub-functions in order to enable sub-functions to be reproduced between devices and also to enable existing devices to be supplemented with newly designed sub-functions. The invention also relates to a device control system which is structured in the manner proposed by the invention. The invention provides a solution to undesirable interaction, so-called feature interaction or feature interference, between selectable sub-functions in a device of the aforesaid kind.

TECHNICAL BACKGROUND

The aforesaid problems have been solved within the telecommunication field, for instance in the telephone system AXE 10 sold by the Swedish company Ericson, in that at the construction stage of the telephone stations of the system, the system designers have prepared each device/telephone station for the connection of predetermined types of sub-functions that the designers anticipate will be required in the future. This preparation involves the construction of separate interfaces, which again involves adding predetermined types of futuristic sub-functions to the device. It is endeavored to make the known interfaces that are prepared for the addition of predetermined types of sub-functions as general as possible within the framework of the type of sub-functions concerned.

However, it is difficult to anticipate all conceivable future sub-functions which do not exist at present in the construction stage of a device.

Problems occur when a new sub-function that is to be designed is of a type for which the device has not been prepared. For instance, it is necessary to determine whether or not the new sub-function can be combined with the existing sub-functions of the device, and it is also necessary to be able to connect the new sub-function to the device.

When determining whether or not the new sub-function can be combined with existing sub-functions, it is necessary to determine the function or performance of the device as a whole and also to determine the various functions or performances of the individual, existing sub-functions and also the function of the new sub-function. Since the device is complex, an analysis of this nature will often be extremely comprehensive and difficult to carry out, even should several designers cooperate with one another to this end. Connection of the new sub-function to the existing device is problematic, because no prepared interface is available. It may even be necessary to redesign the device to suit the new sub-function, and it is possible that some interface in the device must be redesigned and made more general in order for the new sub-function to be connected. It may also necessitate the creation of a totally new interface. Such reconstructions and changes may result in errors and faults that are liable to influence the performance of the device.

Instead of requiring the new sub-function to be combinable with all earlier, existing sub-functions, the designer may elect to make the new sub-function combinable with solely some of the existing sub-functions. Although this solution may satisfy a specific market on which the device with the new sub-function shall be used, the solution is not general to all other devices on other markets. Because the new sub-function can only be combined with only certain, but not all, existing sub-functions, this solution impairs the possibility of future additions of newly designed sub-functions.

A further problem related to devices of the kind described in the introduction resides in the conflict that arises when two sub-functions wish to perform simultaneously two different state changes which are not mutually compatible. In the telecommunication field, this problem is referred to as feature interaction or feature interference. The following examples from the field of telephony illustrate a typical case of call to two different numbers. Two sub-functions are involved in the conflict, namely "diversion follow-me" and "diversion-on-busy".

Diversion follow-me involves a call to the actual telephone number of a subscriber which is redirected to another number specified by the subscriber. Diversion-on-busy signifies that when the subscriber to which a call is directed is engaged on the telephone the call is diverted to another, predetermined telephone numbers. A subscriber can subscribe to one or several sub-functions. The telephone network operator then connects the corresponding sub-function or sub-functions to the subscriber. The subscriber can then activate those sub-functions to which he subscribes, for instance by dialling or keying on the keypad of the telephone a number/sign combination which is unique to each sub-function. Correspondingly, the subscriber can deactivate or disengage an activated sub-function, by dialling or keying on the telephone keypad a number/sign combination which is unique for deactivating each sub-function. Assume that a subscriber, hereinafter called B, has the home telephone number 123456, and that the subscriber has the sub-functions "diversion follow-me" and "diversion-on-busy" connected. When the subscriber B moves into his/her weekend cottage, for instance, he/she may wish all telephone calls directed to his/her home telephone number to be diverted to his/her weekend cottage and consequently activates the "diversion follow-me" sub-function and gives the telephone number to which the call shall be diverted, in this case the telephone number to the weekend cottage, for instance 123789. When the subscriber leaves home in order to go to work, he/she may wish to ensure for instance that an expected important call will be accepted even though the home telephone may be engaged. Subscriber B then activates the sub-function "diversion-on-busy", and gives the telephone number to which the call shall be diverted, in this case subscriber B's work telephone number, for instance 232323. Both of the sub-functions "diversion follow-me" and "diversion-on-busy" operate in the manner desired when they are each activated individually. Assume, however, that the subscriber B has both sub-functions activated at one and the same time. In this case, when an external party calls subscriber B on B's home telephone number and the home telephone is busy, the traffic system is unable to decide whether the call shall be redirected to the subscriber's work place or to the subscriber's weekend cottage.

KNOWN PRIOR ART

To the extent that the aforesaid conflict can be anticipated, the conflict has been solved in the following way with the aid of known techniques. Initially, it is established whether or not one sub-function shall have priority over the other, for instance whether or not diversion follow-me shall have priority over diversion-on-busy. A test is then run in a first program sequence to ascertain whether or not the diversion follow-me feature is activated for the telephone number 123456. If the test result is positive, the call is transferred to the diversion follow-me number given by the subscriber, in this case 123789. If the test result is negative, a further test run is made in a second program sequence in order to ascertain whether or not the diversion-on-busy feature has been activated in respect of telephone number 123456 and whether or not the subscriber is engaged. If the test result is positive, the call is connected to the diversion number given by the subscriber, in this case 232323. If the test result is negative, the second program sequence moves to the next program sequence.

If the device is prepared for the addition of a new sub-function, the tests may also be prepared in the program code. On the other hand, if the device is not prepared for the addition of the new sub-function, the software must be changed.

Thus, the known technique of solving the interaction problem involves anticipating all conceivable interactions and of designing those particular functions which solve the thus identified interactions, from case to case.

Those known interfaces that are prepared for the addition of predetermined types of sub-functions affect the ability of the device to manage interaction-type conflict situations. If interaction between sub-functions can be realized beforehand, interfaces can be constructed to solve the undesirable interaction/conflict. However, tailor-made interfaces do not permit new sub-functions to be added to the device other then such sub-functions for which the interface has been prepared.

SUMMARY OF THE INVENTION

One object of the present invention is to allow new sub-functions to be added to existing devices of the kind defined in the introduction, without needing to change existing sub-functions constructed in accordance with the principles of the invention.

Another object of the present invention is also to allow sub-functions to be reused between existing devices of the kind defined in the introduction, this reuse implying that a sub-function in one device can be reproduced and used in another device.

The invention is also intended to provide a user greater freedom in mutually combining different sub-functions.

A further object of the invention is to provide sub-functions that will resolve interaction type conflicts.

Yet another object of the invention is to provide a general interface that will enable sub-functions, both new and existing, to be connected without the interface needing to know anything about the design of the sub-functions.

The invention is also intended to facilitate the discovery of interacting sub-functions already at the design level.

These objects and intentions are achieved by structurizing the device in sub-functions so that each sub-function will correspond to the smallest functional unit which can be added to or removed from the device. The logical dependencies that exist between the thus divided sub-functions are then identified, said dependencies being a direct consequence of said division and also of the way in which the device functions.

It is also an intention of the invention that implementation of the sub-functions shall not introduce further dependencies between the sub-functions other than those identified. The identified dependencies are referred to below as the basic logical dependencies.

The logical dependencies that exist between optional sub-function together with the sub-functions themselves are all the information that is required in order to be able to determine all potentially possible sets of sub-functions that exist. The reason why these sets of sub-functions shall be determined is explained in more detail below.

The identified basic logical dependencies can be expressed in terms of statement logic or predicate logic. This provides a good overview of how the sub-functions are mutually connected logically. It is convenient to list the basic logical dependencies and to save this list for future use.

Applicant has found among the basic logical dependencies a type of dependency which occupies a place apart from the others, namely the type which means that a sub-function requires one or more other specific sub-functions.

If it is assumed that a sub-function A requires a specific other sub-function B, this dependency can be written as A→B in statement logic. If it is assumed that a sub-function A requires two other specific sub-functions B and C, the same logic dependency can be written as A→B and A→C.

The logic dependencies may be of many different types, of more or less complicated nature. One example of another logic dependency is when a sub-function A requires at least one sub-function that is chosen from amongst a specific group of sub-functions $F_1, F_2, \ldots F_n$. This dependency can be written in statement logic as $A \rightarrow F_1 \cup F_2 \cup \ldots \cup F_n$.

All identified logic dependencies are used to establish all potentially possible sets of sub-functions that can occur in a device. By "set" is meant the permitted combination of sub-functions. Each permitted combination of sub-functions forms a potentially possible set of sub-functions, i.e. forms a potentially possible device. By "potential" is meant that the device may be commercially available, but not necessarily so. Each potential set of sub-functions fulfills the identified logical dependencies.

Of the two dependency examples mentioned, one dependency, namely the dependency which implies that a sub-function requires at least one or more other specific sub-functions, is also used in conjunction with setting-up rules which Govern how sub-functions may be allowed to refer to one another. Generally speaking, the insertion of a reference between sub-functions, for instance sub-function B refers to sub-function A, signifies the creation of a logical dependency between B and A. According to the invention, any sub-function, referred to as the subject sub-function, whatsoever may only refer to one or more other specific sub-functions when the subject sub-function requires the specific other sub-function or sub-functions. Because of this rule, no new, unpermitted logical dependencies can be introduced into the device, since the sub-function or sub-functions referred to are definitely found in each device in which the subject sub-function exists. This reference rule is also significant to the design of new sub-functions that did not earlier exist. If a newly designed sub-function is added to a device, the basic logical dependencies existing between the sub-functions of the device will not be changed. However, new logical dependencies will occur between the newly designed sub-function and the existing sub-functions.

When the basic logic dependencies have been identified, there are found one or more sub-functions which do not require one or more other specific sub-functions. Each of the former is then called a basic function. A basic function is thus free-standing and does not depend on one or more specific sub-functions and thus cannot, according to the rule concerning references, refer to other specific sub-functions. Remaining sub-functions, i.e. those which require one or more other sub-functions are referred to as optional sub-functions, in the following abbreviated to optional functions. On the other hand, a basic function can require an unspecified sub-function from amongst a group of sub-functions.

When a stimulus, also called input signal, arrives at the device while the device is in a given state, it is necessary for the device to determine how it shall react to the incoming stimulus. The aforesaid state machine is a simplified model and is not suitable for use when the number of states is large, since the table describing all conceivable combinations of input signals and states would then be extremely comprehensive. For instance, a telephone exchange may have $10^{10.exp7}$ different states. It is not possible in practice to describe each of these states in clear text, due to the enormous amount of information involved. The table also requires a large memory area. Instead, it has been possible hitherto to effect a state change from a stable state A to a new stable state B, by performing small successive, temporary state changes from A towards B, by testing parts of the stable state A.

By "state" is meant in this patent specification the total state of the device as well as the steady states. A state can be divided into parts or components that are related to one another. These part states or components are called partial states in the following. Partial states also have time duration or permanence. Examples of partial states of a telecommunication device are connected subscriber numbers, subscriber line busy, subscriber line free, category affiliation, subscriber numbers. These terms represent the expressions that are used verbally when wishing to describe a partial state.

It is proposed in accordance with the invention that incoming stimuli are tested against partial states of the device, with the intention of establishing the current combination of device stimulus and states.

According to the invention, testing of the state (also called analysis) against incoming stimuli is divided into a sequence of steps, called analysis steps, in a manner described below. The analysis is effected in the sub-functions of the device. One or more analysis results are obtained with each analysis step. An analysis step is terminated in a so-called interruption point, or take-over point. The result obtained with an analysis step is associated with the interruption point of the step. According to the invention, the analysis result in a later step in said sequence is based on a larger number of partial states compared with the analysis result obtained in an earlier step in said sequence. The object of the analysis result is to determine the new state and possible output signals from the device. The analysis result can also be used to generate cooperation between sub-functions in a manner which enables some sub-functions to interrupt the analysis sequence of other sub-functions.

Examples of the analysis result of a sub-function are establishing that a call has occurred, that a digit has been received, that an attempt to call a B-subscriber has been made, and so on, i.e. the expressions that are used naturally when wishing to describe the significance of a sub-function verbally.

According to the invention sub-functions which so desire are able to interrupt the analysis of a sub-function at said interruption points. The reason why other sub-functions wish to interrupt the analysis may be because they wish to modify or supplement the current analysis.

Applicant has found that the aforesaid structuring of sub-functions in partial states and the analysis result enables the creation of new sub-functions which can be connected and disconnected by a general interface. This general interface need only be aware of the partial states and the analysis results of the new sub-function, but need not be aware of how the sub-function is designed.

Due to the structuring of a sub-function into partial states and analysis results, it is an easy matter to design a sub-function, since there is obtained a strong connection between the verbal description of the sub-function at target specification level and the structuring of the sub-function. Thus, it is easy to subsequently understand the purpose of the designed sub-functions without needing to have a complete overview of the purpose or function of the entire device.

In addition to the aforesaid sub-functions, a device created in accordance with Applicant's concepts also comprises a sub-function control unit.

According to the invention, operations are used to achieve state changes. Operations are also used to generate output signals. Those operations that shall be used are determined by one or more analysis results. Operations are found in sub-functions and are specific for each sub-function. Alternatively, the control unit has access to a general operation that applies to a number of sub-functions and performs state changes and/or transmits output signals.

According to the invention, no change in state occurs before the analysis phase is terminated. The analysis phase is followed by an execution phase during which the aforesaid state changing operations are put into effect. The advantage with this is that the control unit need not keep an account of earlier states and response signals, as is the case with the known devices in which several minor state changes take place continuously in directions towards a new stable state.

The described working method also enables the design of sub-functions which change the analysis result of earlier existing sub-functions. However, none of the operations will be executed until each of the sub-functions of the device has performed its respective analysis of the current state.

According to the invention, interaction type conflicts are resolved with the aid of new types of sub-functions referred to by Applicant as interaction functions. An interaction function is structured in the same way as other sub-functions.

According to the invention, the control unit discovers when two or more sub-functions interact and then assigns further analysis of the current state to a separate interaction function that is related to the current interaction. If the control unit lacks such an interaction function, the control unit sends a message to the operator to this effect. The system operator then has the possibility of creating an interaction function that will resolve the conflict. This interaction function is added to the device in the same way as any sub-function.

Because the sub-functions, also including the interaction functions, are described in terms of partial state and analysis result, i.e. terms that can also be used when wishing to describe verbally the function of a sub-function, it is the Applicant's opinion that conceivable interactions between sub-functions can be anticipated more readily than in the case when adding new sub-functions to a device that has not been prepared earlier for the addition of sub-functions. This is the case because the last-mentioned device becomes more and more complicated with the addition of more new sub-functions and since it then becomes difficult to obtain an overview of the function of the total device.

A sequence of analysis steps is configured so that the analysis result from a later step will always build on strictly more information than an earlier step. This enables the ordered sequence of steps to be retained, even when changing the implementation of a sub-function.

The control unit need not be aware of the design of an individual sub-function nor its mode of operation. When adding a sub-function to the device, the sub-function declares its own reference, references to other sub-functions that it requires, and those analysis steps into which it desires to enter and interrupt the analysis of other sub-functions. Furthermore, the sub-function that is to be added to a device will itself declare its own analysis steps at which other sub-functions may conceivably wish to interrupt. In this way, there is created a unitary interface for connecting and disconnecting a sub-function to and from a device. The sub-function to be thus connected or disconnected may be a sub-function that exists in another device in, e.g., another market and which is to be connected to the current device, or the sub-function may be a newly designed sub-function.

Earlier known devices have no clear division between, on the one hand, the analysis result and, on the other, the state change and transmission of output signals. This makes it difficult to add new sub-functions that are to give new state changes. The addition of a new sub-function normally means that for a given combination of input signals and states, another state transition shall be effected and another output signal transmitted, as compared with the situation when the new sub-function is not added.

As before mentioned, all analyses are terminated prior to making any state changes and transmitting any output signals. A new sub-function is permitted to modify or supplement the analysis of earlier existing sub-functions, which may result in another state transition and the transmission of another output signal, as compared to the case when the new sub-function is not connected.

The structuring of the device in optional sub-functions, the identification of the logic dependencies, the creation of rules which govern how sub-functions are allowed to refer to one another, the structuring of sub-functions into analysis results and partial states, and the way in which the control unit coordinates occurrent interruptions of the analysis performed in sub-functions all in accordance with the inventive proposals, will prepare the device for augmentation with new sub-functions. However, existing sub-functions need not have any knowledge of newly designed sub-functions, neither of how such new sub-function are designed, how they operate or how they are realized. Thus, if an existing sub-function or a newly designed sub-function is to be combined with an existing device, the existing device must not be changed in order to allow the new sub-function to be added thereto. Instead, it is the new sub-functions that must refer to the existing sub-functions.

BRIEF DESCRIPTION OF THE DRAWINGS

The invention will now be described in more detail with reference to the accompanying drawings, in which FIGS. 1–4 illustrate different devices that have been structured into optional sub-functions;

FIGS. 5–7 are diagrammatic illustrations showing the logical dependencies between sub-functions;

FIG. 8 illustrates a device structured in accordance with the invention;

FIG. 18 illustrates the structure of a sub-function according to the invention;

FIGS. 19A–19I are flow sheets which describe the manner of operation of the control unit during the analysis phase.

SPECIAL DESCRIPTION

Figure 9:
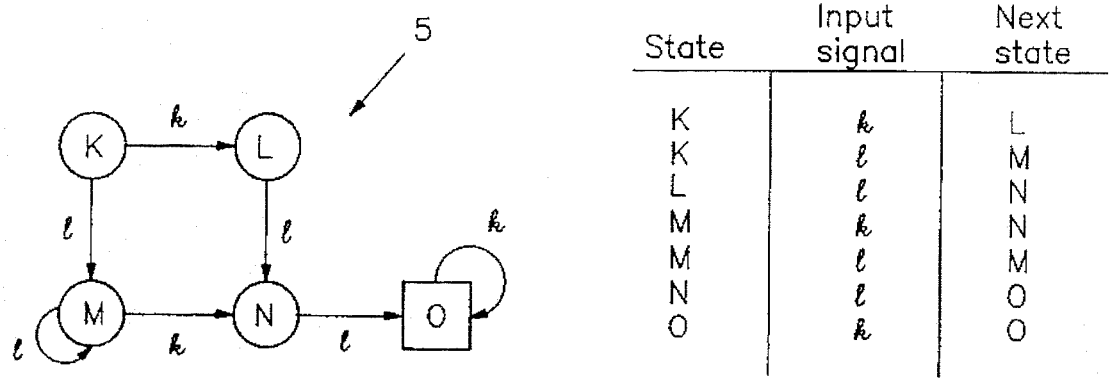
FIG. 9 illustrates a known state machine and associated state table.

The invention will be described in the following with reference to various examples of the telecommunication field, and in particular to the field of telephony. It will be understood, however, that the invention is not restricted to the described examples and that the inventive principles can be used generally with a device of the kind which is sold or can be sold on different markets, which has optional sub-functions, and which has a method of operation that can be described with the aid of a state machine model. Normally, different markets will wish to supplement the operational method of a basic device with one or more sub-functions. It is possible that a sub-function is already in existence on one market, in which case it shall be possible to duplicate the existing sub-function and integrate this function with an existing device on another market. It may sometimes be desired to remove an existing sub-function from a device which exists on one market and replace this sub-function with a newly designed sub-function that has been designed particularly for precisely this market or which is general and can be used on all existing devices on other markets.

FIG. 1 illustrates schematically a device 1 the function of which shall be divided in accordance with the principles of the invention. The device is, for instance, a very simple telephone exchange having sub-functions A and B, where A denotes the basic telephony functions POTS (Plain Ordinary Telephony Service) of receiving and connecting calls, and B denotes a sub-function, such as a "diversion follow-me" function.

According to the principles of the present invention, a sub-function is optional when the sub-function can be added to or removed from the device on a market. The diversion follow-me function can be removed from the device 1, because "POTS" will still remain in the device and it is meaningful to sell "POTS" on its own, i.e. without the diversion follow-me function, as a device on a market. B is thus an optional sub-function. On the other hand, it is not possible to remove "POTS" from the device 1, since all that would remain is the diversion follow-me function and no customer would be interested in purchasing solely the diversion follow-me function. It is probable that when a customer wishes to purchase the diversion follow-me function, he will also wish to purchase "POTS", because the diversion follow-me function has no value in itself. A is not therefore an optional sub-function. This applies under the assumption that A, in turn, is not dependent on any other sub-function, and we assume here that so is not the case. This very simple analysis of the function of the device shows that A is not dependent on the existence of B and that B is dependent on the existence of A. This can also be expressed as A being independent of B and of B requiring A. When the existence of B requires the presence of A, a statement logic expression can be written as B→A. It has been established above that the converse, A→B, does not apply. We thus have a unidirectional logical dependency between the sub-functions A and B. Subsequent to having established this logical dependency, we can also establish that A and AB are potentially possible devices as seen from a commercial aspect. Thus, the established logical dependency excludes B as a potential device.

Another observation can be made with regard to the description of the sub-functions. The free-standing sub-function A cannot refer to B, of whose existence A is unaware. On the other hand, the sub-function B, which cannot exist without A, can be permitted to refer to A.

A sub-function which does not require any other sub-function is referred to hereinafter as a basic function.

FIG. 2 illustrates a device 2, which differs from the device 1 in that it includes an additional sub-function C, for instance "diversion-on-busy". A and B are the same sub-functions as those in FIG. 1 and thus A is not optional and B is optional. Using the same reasoning as that used above, it can be established that "diversion-on-busy" is dependent on the existence of A and that A is not dependent on the existence of "diversion-on-busy". This unidirectional dependency can be written as C→A. C is thus an optional sub-function. Structuring of the device 2 now continues with an investigation of the mutual relationship between "diversion-on-busy" and "diversion". Neither C nor B is dependent on the other for its existence. Apparently, no logical dependency may then exist between C and B. The one sub-function can be removed without influencing the other. Thus, the logical dependencies B→A and C→A apply to the device 2. These can be presented by the graph of unidirectional logical dependencies shown in FIG. 2, from which it is then possible to draw-up conceivable, i.e. potentially possible, sets of sub-functions in which each set represents a potential device, i.e. a device which is feasible from a commercial aspect. These potentially possible sets of sub-functions are A, AB, AC and ABC and are listed on the bottom right of FIG. 2. It should be noted that the established logical dependencies exclude as a conceivable device a) B on its own, b) C on its own, c) solely C and B in combination.

FIG. 3 is a graph of unidirectional dependencies for a device 3 that has been divided into optional sub-functions A, B, C, D, which have the logical dependencies stated in the graph and all of which are of the type with which the existence of a sub-function requires another sub-function. The added sub-function D is, for instance, a speech enquiry device which asks the caller where he wishes to be connected, in the event that the number to which the call shall be transferred is also busy. The example shown in FIG. 3 is intended to illustrate that an optional sub-function may also require another, specific optional sub-function, in this particular case that D requires B. Those potentially possible sets of sub-functions that can occur in this particular case are A, AB, AC, ABC, ABD and ABCD and are shown on the bottom right of FIG. 3. It should be noted that, for instance, the combination ACD cannot occur, since the existence of D requires the presence of B and B is not found in the combination ACD.

FIG. 4 illustrates an example of a device 4 which has been divided in accordance with the invention and in which it has been established that there is found a sub-function D whose existence requires the presence of several sub-functions, namely B and C. Corresponding potentially possible sets of sub-functions are shown on the bottom right of the Figure. It will be noted that neither the combination ABD nor the combination ACD are possible, since the existence of D requires the presence of B and C. The sub-function D of this example is not the same as the sub-function D of the FIG. 3 example.

By faithfully following the rule that a sub-function, in order to exist, must require presence of one or more other specific sub-functions and by combining this requirement with the requirement that a sub-function shall be optional no such two-directional logical dependency of the kind illustrated in FIG. 5 can occur. FIG. 5, the existence of the sub-function H is dependent on the sub-function G, and the existence of the sub-function G is dependent on the sub-function H. In this case, however, H cannot be removed. If H is removed, it is then necessary to remove also G. Conversely, G cannot be removed without removing H. If it is desired to remove either G or H, it is then necessary to remove both, i.e. both G and H.

A graph drawn while observing the logical dependency that a sub-function requires the presence of one or more other, specific sub-functions will not include any loops of the kind shown in FIG. 6. FIG. 6 shows that the sub-function G requires the sub-function H, which in turn requires the sub-function I. In turn, the sub-function I requires the sub-function G. In this case, it is not possible to remove, e.g., solely G, because G requires H. When wishing to remove either one of G, H or I, it is necessary to remove all sub-functions, i.e. G, H and I.

The aforedescribed logical dependency that a sub-function requires one or more other, specific sub-functions is merely an example of a logical dependency that can exist between sub-functions in a device. Many other types of logical dependencies exist. However, the aforesaid logical dependency has a unique character, since it enables the construction of rules which govern how sub-functions may refer to one another.

One example of another logical dependency that can exist between sub-functions in a device is the dependency described in the introduction, namely that a sub-function requires at least one sub-function from a specified group of sub-functions. Consider the sub-function A in FIGS. 1–4. The sub-function A represents the basic function "POTS", fundamental to telephony. "POTS" assumes that a subscriber has access to the telephone network. This access can be achieved in several different ways. Examples of different subscriber line accesses are dial pulses from an analog telephone set provided with a dial tone signals from an analog telephone set provided with a key set and coded digital signals from a digital telephone set. These three types of accesses form a group of sub-functions which can be written as $\{F_1, F_2, F_3\}$. In order to be meaningful, each of these functions will depend on the sub-function A. The sub-function A, on the other hand, need not be aware of the existence of all individual access functions, since it is sufficient for A to be aware that an access function exists. The specific access function involved is immaterial to A. Here, it is a question of a strong logical dependency in one direction together with a somewhat weaker logical dependency in the opposite direction. In terms of statement logic, the unidirectional logical dependency in one direction can be expressed as a number of implications: $F_1 \rightarrow A$, $F_2 \rightarrow A$ and $F_3 \rightarrow A$. $F_1 \rightarrow A$ is read-out: When $F_1$ is true (=exists) A is also true, i.e. also exists. The somewhat weaker logical dependency in the opposite direction can be written as $A \rightarrow F_1 \cup F_2 \cup F_3$, which is read as: When A exists then $F_1$ or $F_2$ or $F_3$ is true. It should be noted that each of the functions in the set $\{F_1, F_2, F_3\}$ is optional. On the other hand, not all functions in the group can be removed, since A would not then be meaningful. If all access functions are removed, "POTS" would then be meaningless, however. "POTS" requires, after all, at least one access function.

Many other types of both simple and complicated logical dependencies occur between sub-functions in a device. The identity of the selectable sub-functions and the nature of the logical dependencies will depend on the individual device.

We can now formulate the principle that is fundamental to the present invention, namely that the basic logical dependency of a device will not be changed when adding a sub-function provided the sub-function is so designated as to be permitted to refer to optional, specific sub-functions required by the sub-function itself.

Consider the potentially possible sets of sub-functions in FIG. 3, for instance. All sets fulfil the basic logical dependencies. If in one of these sets a specific sub-function, called the subject sub-function, is present, then the sub-function or those sub-functions which the subject sub-function requires, will exist in said one set. For instance, the sub-function B is present in the potentially possible set ABC in FIG. 3. The sub-function B requires A. The sub-function A is present in the set ABC. The sub-function A is also present in all remaining potentially possible sets of sub-functions in which sub-function B exists. Yet another example which clarifies the same thing: Reconsider FIG. 3 and the subject sub-function D. D itself requires B. B is present in the set ABCD. B is also present in the set ABD. Thus, B is present in all sets in which D is present.

Applicant has found that particular requirements must be placed on the manner in which a sub-function shall be described, in order for a sub-function, called the subject sub-function, shall not change the existing basic logical relationships between sub-functions in a device, when the subject sub-function is added to or removed from a device that has been structured in accordance with the aforesaid principles.

The basic function A in FIGS. 1–4 requires no specific other sub-function and can therefore be described solely with itself as a starting point. Expressed in another way, the basic function A may not refer to any specific sub-function.

When the sub-function B is described, it may be described from within itself and may refer to the sub-function or sub-functions which it specifically requires, in this case the basic-function A. On the other hand, the sub-function B may not refer to the sub-function C, since it shall be possible to remove C. If C is removed, which is possible according to the aforesaid assumptions, and B has a dependency on C, this means that B will be false. This opposes the assumption that B exists. Thus, B cannot refer to C and still retain the aforesaid logical dependencies B $\rightarrow$A and C$\rightarrow$A.

A corresponding statement will apply to the sub-function C. C may only refer to itself and to A, but not to B.

The advantage afforded by these description rules, which are based on the aforesaid logical dependency that a sub-function requires one or more other specific sub-functions, is that those sub-functions required by the subject sub-function will always exist in the set of sub-functions in which the subject sub-function is included.

One advantage afforded by structuring a device in optional sub-functions is that the structuring can readily be made verbally with a sole starting point from the way in which a sub-function is described. The aforedescribed analysis of the device in, e.g., FIGS. 1 and 2 was particularly simple and required no analysis depth.

The analysis was formalized with the aid of statement logic expressions. Although such expressions are not necessary to an understanding of the invention, these expressions make it easier to establish whether or not a set of sub-functions is also a possible set of sub-functions.

However, the example given in the introduction to the description shows that the sub-functions B and C interact when both are activated simultaneously. The effect of this interaction is that the device will call two different numbers simultaneously, these two procedures being mutually incompatible. When a sub-function, for instance C, is to be described, i.e. designed, it is obviously not sufficient to describe the sub-function from within itself when wishing to prevent the occurrence of interaction.

Applicant has found that it is possible to create a new class of sub-functions, called interaction sub-functions, shortened to interaction functions, which are described in the same way as a sub-function and the purpose of which is to resolve the conflict that occurs when two or more sub-functions interact with one another.

According to the invention, when two sub-functions, for instance B and C, interact, there is created a new sub-function called an interaction function which contains a new logical dependency, namely the logical dependency that occurs when both B and C are included in a device. The interaction function is referenced B*C. In terms of statement logic, the dependency between B, C and B*C can be written as B∩C→B*C and the converses B*C→B and B*C→C respectively. The expression B∩C→B*C is read-out: If B and C exist, then B*C also exists. The expression B*C→C is read: If B*C exists, then C also exists. This can be illustrated graphically in the manner shown in FIG. 7. The same rules as those earlier described apply when describing an interaction function, namely that the interaction function may describe what it can do itself and may also refer to those sub-functions that it requires.

It is assumed in FIGS. 3 and 4 that the sub-functions B and C do not interact. In FIG. 8, which is similar to FIG. 3, it is assumed that the sub-functions B and C do interact, and there is then obtained those dependencies and those potentially possible sets of sub-functions that are shown in FIG. 8.

The manner in which the new interaction function operates is determined from case to case, depending on the identity of the interacting functions and the manner in which the designer wishes to resolve the interaction. In the particularly described case, the designer may, for instance, decide that B shall have priority over C. Yet another solution is to give C priority over B. Another possible solution is to connect-up a speech enquiry device which asks the calling subscriber to give the number to which he wishes to be connected, e.g. to B's weekend cottage or to B's work place.

The designer of a new sub-function need not have detailed knowledge of the device with which the sub-function shall be combined, but need only have knowledge of: (a) those sub-functions which the new sub-function requires in order to be executed; and (b) the aforesaid identified logical basic dependencies. If the new sub-function has a logical dependency which conflicts with the identified logic dependencies, a fact which the designer can easily determine, then the designer simply creates a new interaction function which resolves this conflict. One example illustrates this latter situation. Consider FIG. 3 and assume that the designer will add a new sub-function E and that this new sub-function shall be capable of being used in all six potentially possible sets of sub-functions. This means that E may not be dependent on sub-function D, for instance. This is because when E is dependent on D, E becomes meaningless in combination, e.g., with the set ABC, which lacked D. In this case, the designer will ask whether or not E is truly dependent on D. It is perhaps possible instead to design E so that it is described from within itself and as being dependent on the basic function A. There is now constructed instead a new interaction function D*E for the weak dependency that remains between E and D. In this way, (a) the way is left open to move the sub-function E from device to device, and (b) all devices will be prepared for the addition of new sub-functions. It should be noted that none of the basic logical dependencies is changed by this measure. It should also be noted that none of the sub-functions required by E and D*E requires knowledge of the existence of E and D*E. A is described from within itself and may not refer to other specific sub-functions, and D is described from within itself and refers to A.

Because interactions between sub-functions are treated as a sub-function per se, highly complicated interactions can be readily handled.

A consequence of the rules as to how sub-functions are permitted to refer is that sub-functions that have been designed in accordance with the invention have no bindings to new sub-functions that are added later. Instead, it is the new sub-functions that are permitted to make their own bindings to the existing sub-functions that they require.

As described in the introduction, the invention can be applied with devices whose manner of operation can be likened to a state machine. Among other things, a state machine is characterized in that it has a stable state, incoming stimulus and response. A combination of an input stimulus with a state signifies that a current state shall be changed or maintained. Thus, the invention cannot be applied to mathematical calculations, algorithms, etc., for instance, which do not have any states.

One example of a state machine, which is described below with reference to a known model, is illustrated in FIG. 9, in which the circles K, L, M, N signify stable states, and the squares O signifies a final state. The arrows k, l denote incoming stimulus-signals. All states are stable, i.e. have permanency until a new input signal arrives. In the following, the term "state" means the total state of a device, a network or a node in a network, and also that the total state has a permanency, referred to as steady state. Normally, a new state is reached because an input signal gives rise to a transition to the new state without passing through any intermediate state transitions. The state table of the machine is shown to the right in FIG. 9. If the machine assumes the state K and receives the input signal k, the machine will always change to the new state L. The state machine is deterministic, meaning that each combination of an input signal with a state will unequivocally determine the next state that the state machine shall reach. This next state may be a new state, or may be the same state as the preceding state. Thus, it can never happen that the combination of input signal k and state K will sometimes, perhaps in 70% of cases, result in a transition to the state L, and in the remaining 30% of cases result in a transition to the state M.

When the machine is in state K and instead receives the input signal 1, the machine will reach the state M. When the machine is in state M or in state L and receives the input signal l, no change in state takes place. On the other hand, if the machine receives the input signal k, the machine will reach the final state N. From the final state N the machine can only reach a new final state O when the input signal is l. It will be evident that the state N is reached from the state K irrespective of the sequence in which the input signals k and l arrive.

The states K–O in the FIG. 9 example represent the total states of the machine. If the machine is a model which describes how a telephone station works, each of the states K–O will represent the total state of the telephone exchange. It is not possible in practice to set-up, for a telephone exchange, a list similar to the list shown to the right in FIG. 9, since the number of states involved is enormous, in the order of $10^{10exp7}$. It is impossible with reasonable work input to list all of these states and to give each state a unique designation.

Figure 10:
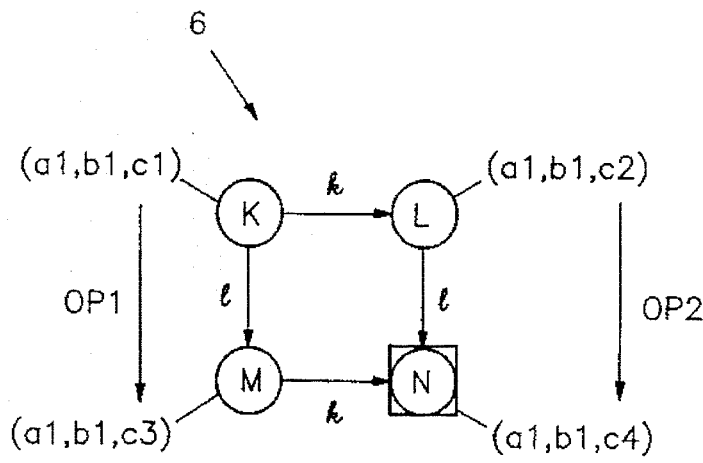
FIG. 10 illustrates a state machine which is used as a model to describe the manner of operation of a device structured in accordance with the invention.

FIG. 10 shows a new state machine which is used as a model for a device according to the invention. The new state machine is similar to the FIG. 9 example and the novel element of said device is that each stable state of the device is comprised of a number of mutually related components and that operations which effect state changes are present. The components of a state are called partial states in the following. The sum of all partial states forms the total state. A partial state is referenced with lower case letters to which an index has been added. This has been done solely for typographical reasons. The indexed lower case letters should not be confused with the input signals, since there is no connection therebetween, despite the input signals being referenced with lower case letters.

Each potential set of sub-functions can be described with the state machine in FIG. 10 as a model. The number of states in the state machine varies from set to set. The number of states increases when a new sub-function is added to the device.

The following example illustrates in a simple way the technique used in accordance with the invention to determine a state of a device, by analyzing stimulus in combination with partial state.

The state K is comprised of a number of mutually related components called partial states. These partial states are referenced $a_1$, $b_1$, $c_1$. The state M consists of partial states $a_1$, $b_1$, $c_3$. The state L consists of partial states $a_1$, $b_1$, $c_2$ and the state N consists of partial states $a_1$, $b_1$, $c_4$. By "related partial states" is meant that the partial states are linked to one another. An example taken from the field of telecommunications is that a specific subscriber line is linked to a specific subscriber number which in turn is linked to a subscriber category. An operation OP1 causes the component $c_1$ to change to $c_3$, and the state of the device thus changes from K to M when the input signal l arrives and the device is in the state K. Other partial states are evident from the Figure. Another operation OP2 changes the partial state $c_2$ to the partial state $c_4$ when the device is in the state L and the signal l arrives, which causes the device to switch to the new state N. Also found are a number of states O, P . . . Z, whose partial states are not shown but which are assumed to be different to the partial states shown in FIG. 10. The illustrated operation OP1, the illustrated states, the number of states, the illustrated partial states and the number of partial states for each state are only examples that are used to explain the invention.

Figure 11:
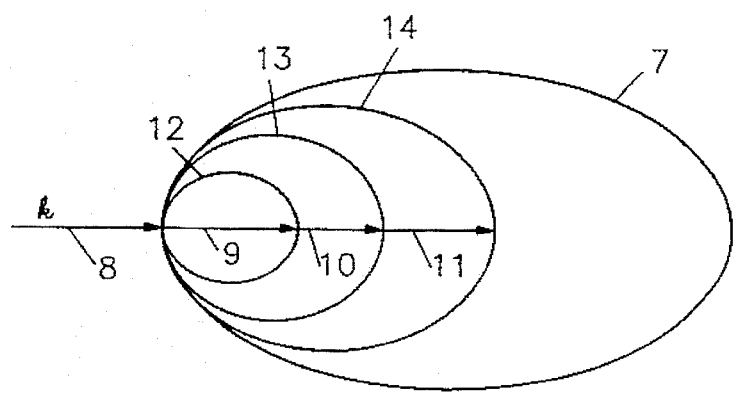
FIG. 11 illustrates an analysis chain including a number of analysis steps in the space of all partial states of a device.

Thus, in FIG. 11, the analysis of the additional partial states 14 is based on the result of the analysis of the partial states 13. An earlier step in the analysis chain is based on a small amount of information and a later step is based on a larger amount of information than said small amount. If the sequence in which the partial states are analyzed can be reversed, then according to the principles of the invention these partial states shall belong to one and the same analysis step. This carries two advantages.

The first of these advantages is that a unitary and unequivocal rule is obtained as to how analysis steps shall be chosen. In principle, the partial states can be tested in many different ways and in smaller or larger steps. Different designers may use different sequences. This makes it difficult for other designers who wish to design new sub-functions to learn why precisely one specifically given sequence shall be observed when so many other sequences are conceivable. The introduction of said rule for the sequence of partial states enhances the understanding of how a device is constructed.

The other advantage is associated with the occurrence of interaction between sub-functions and means that an automatic priority is given to sub-functions that occur in earlier steps in the analysis chain.

According to the invention, the operations are distributed among sub-functions and a control unit described below. Operations function to change partial states and produce output signals. Partial state changes can occur in the a sub-function in which an operation occurs, or may take place in another sub-function to which a sub-function refers. Partial state changes can take place in hardware, software or combinations thereof. Operations are implemented in the form of software, hardware or combinations thereof. The individual operation depends on those partial states that are involved in the partial state change. When the partial states involved are those referred to as "subscriber line free" and "subscriber line busy" mentioned in the above example, one operation is "seizure of subscriber line" and another operation is "release of a seized subscriber line". Which of these two operations is concerned is, in turn, dependent on the direction in which the partial state change takes place. Another example of an operation which involves partial state change of software and hardware is an operation which sets-up a connection between two subscriber lines. In this case, the partial state change in the software forces a change of state in the hardware of the telephone exchange.

Each state of a device is associated with a number of possible external stimuli and a number of potential external responses. In order to determine whether a state shall be changed or retained in response to a stimulus, it is not the total state in combination with said stimulus that is analyzed, but partial states in combination with said stimulus. The analysis phase is initiated with an external stimulus and is carried out in an ordered sequence of analysis steps. Each analysis step gives at least one analysis result. One or more partial states in combination with an external stimulus forms an analysis result. The analysis begins in the sub-function that is associated with said external stimulus and continues in this sub-function, either until the analysis is completed or the analysis is continued in a sequence of sub-functions, although always in one sub-function at a time, until it stops.

There is found for each combination of states and external stimuli a process which:

(i) generates a new partial state or, depending on the combination concerned, retains the same partial state; and (ii) generates at least one external response or, depending on the combination concerned, does not generate an external response.

According to the invention, each such process is divided into an analysis phase and an operation phase. The operation phase is not started until the analysis phase has stopped. The result of the analysis phase may be:

(a) that the state shall be changed, in which case the analysis result specifies those operations that cause the new state; or (b) that the state shall be kept unchanged.

The analysis phase of each case (a) and (b) may result in:

(c) that at least an external response shall be given, whereby the analysis result specifies those operations that generate said external response; or (d) that no external response shall be given.

Figure 12:
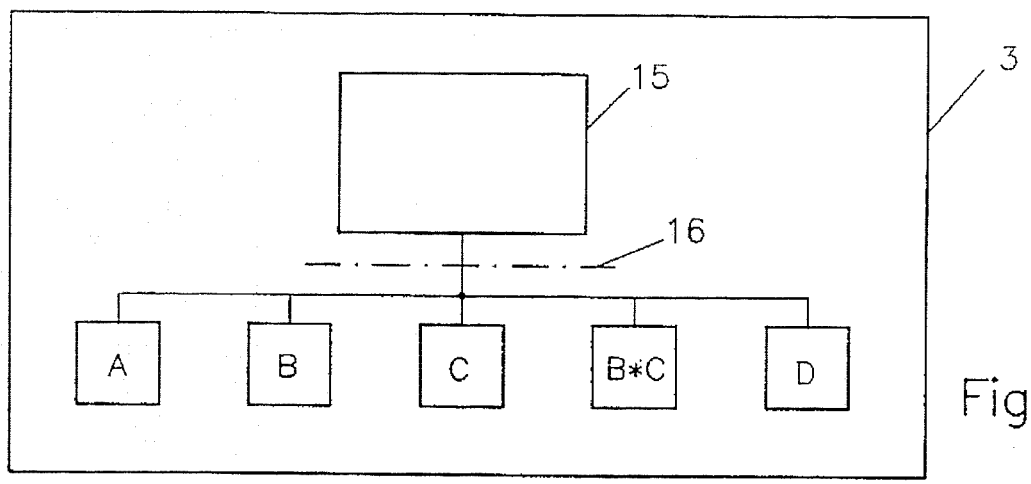
FIG. 12 is a block diagram which illustrates an inventive device provided with sub-functions and a control unit.

FIG. 12 illustrates a device 3 and a control unit 15 according to the invention. The basic function A, the sub-functions B, C and D, and the interaction function B*C have all been described with reference to FIG. 8. The control unit 15 is used together with the device 8 to: (a) cause state changes or retain a current state; (b) effect transmission of output signals; and (c) add (connect) and remove (disconnect) a sub-function to the device in a unitary manner and through a unitary interface 16. By unitary is meant that connection and disconnection respectively is made in the same manner irrespective of sub-function and irrespective of the manner of operation of the sub-function. In other words, the interface 16 need have no knowledge of the nature of the sub-function in order to add this sub-function to the device 8 or to remove said sub-function from said device. Neither need the control unit have knowledge of the manner of operation of an individual sub-function, but need only have knowledge of the parameters of this particular sub-function. In other words, the control unit need only have knowledge of the structure of an individual sub-function. Neither need the control unit know how an individual sub-function is realized.

The interface 16 includes a reference to the sub-function which shall be connected or disconnected referred to as the subject sub-function, and also information relating to analysis steps existing in the subject sub-function, in which analysis steps other sub-functions are afforded the possibility of interrupting the subject sub-function.

When the subject sub-function is an optional function, the interface 16 will contain references to all sub-functions required by the subject function. In this case, the interface may also include references to such other sub-functions and analysis steps in such other sub-functions in which the subject sub-function is potentially interested to enter and interrupt the analysis proceeding therein for the purpose of modifying the analysis.

The interface 16 also includes references to such sub-functions and analysis steps therein in which the subject sub-function wishes to initiate a sub-analysis branch for supplementary analysis.

When the subject sub-function is an interaction-type optional function, the interface 16 will include references to the interacting sub-functions whose mutual conflict can be resolved by the interaction function. Such references either refer to a specific group of optional functions or to several groups of optional functions.

The manner in which the device 3 illustrated in FIG. 12 works can be described in five stages. In the first stage, the device 3 reaches a stable state which has a given permanence. In the second stage, an external stimulus, input signal, arrives at the device. In the third stage, the stimulus initiates an analysis phase which provides a number of analysis results. The analysis results arrive in an ordered sequence in a number of analysis steps. One or more analysis results are produced in each analysis step. Other sub-functions are able to interrupt the analysis in a so-called interruption point in an analysis step. In the fourth step, the result of all analyses provides a number of operations which, in turn, can change a number of partial states, implying that new partial states are reached and that a new total state is reached. In the fifth step nothing will happen in the device 3 until a new stimulus arrives.

The manner in which the control unit 15 operates will be described in a non-complete manner in connection with an example that refers to FIG. 13, with the intention of giving the reader a feeling for the general function of the control unit and to obtain an understanding of the terms interruption point, analysis result, analysis chain and modification of sub-functions.

Figure 13:
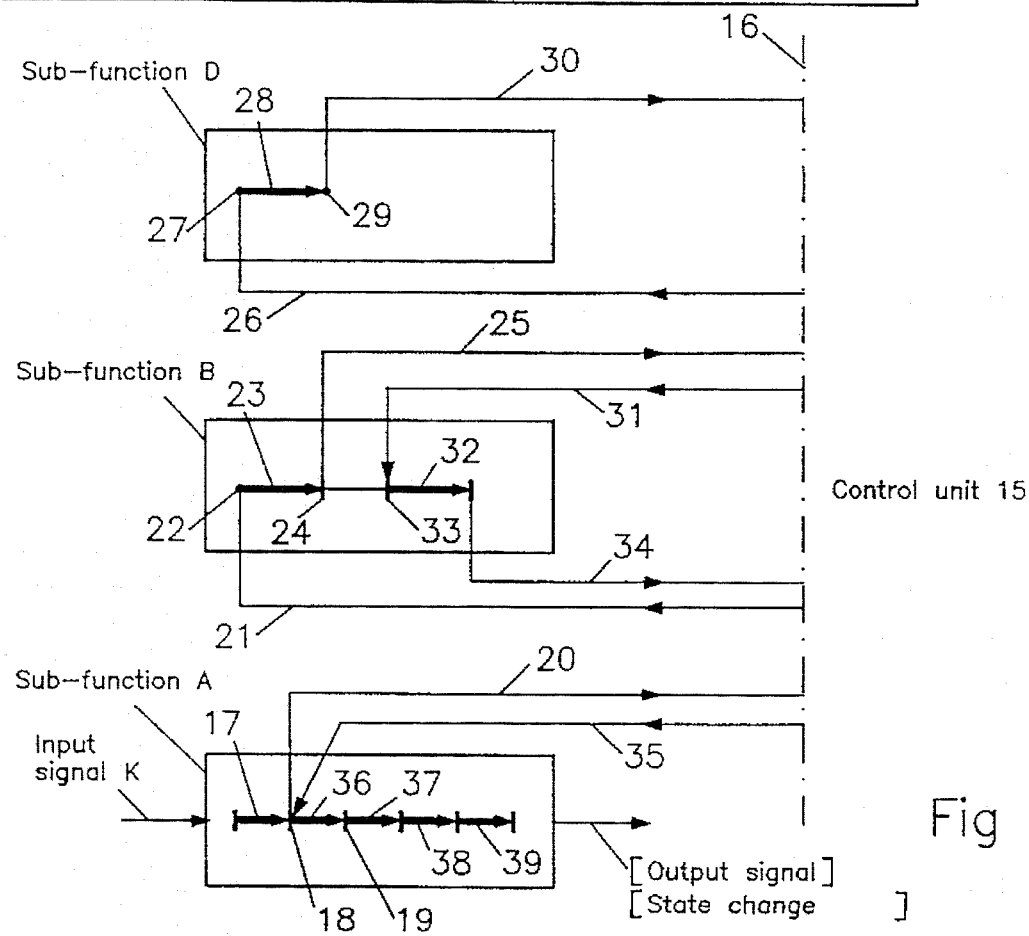
FIG. 13 is a diagrammatic, schematic illustration of the execution of one example of a number of sub-functions according to FIG. 8 and FIG. 12.

It is assumed in the example illustrated in FIG. 13 that the basic function A and the sub-functions B and D from FIG. 3 are connected to the control unit 15, which is found to the right of the interface 16. An incoming signal K to the basic function A gives rise to an analysis chain whose first analysis step is shown by the heavy arrow 17. The analysis step stops at an interruption point 18 which represents an analysis result. The analysis result is used to determine the total state of the device. The basic function A includes a plurality of interruption points 18, 19, which are shown with short vertical lines. The sub-functions B and D also have interruption points, which are marked in a similar fashion. The analysis step 17 sends its analysis result to the control unit 15, as shown schematically by the arrow 20. In this case, the result of the analysis consists in information that the interruption point 18 has been reached in the basic function A. The control unit 15 searches in tables (described below) for those sub-functions that are interested in interrupting the basic function A at the interruption point 18 in order to modify or to supplement said basic function. Generally speaking, none, one or more sub-functions may be potentially interested in interrupting the basic function. If no sub-function is potentially interested in interrupting the basic function, then the analysis is continued in the basic function A. If a sub-function is potentially interested in interrupting the basic function, the control unit 15 first sends a query to this sub-function enquiring whether it intends to interrupt the sub-function in this particular case. The potentially interested sub-function then makes an analysis of its own with the intention of investigating whether or not it is interested in interrupting the basic-function A in precisely this case with precisely those partial states that exist. For instance, the sub-function B may be a subscriber service which can be activated by the subscriber. Depending on whether the subscriber service is activated for a certain subscriber number, the sub-function B will perhaps go in and interrupt the basic function, and sometimes not. In the FIG. 13 example, it is assumed that the sub-function B reports its interest to interrupt the basic function A to the control unit 15. The control unit 15 then assigns continued analysis to the sub-function B, as marked by the arrow 21. For the sake of completeness, it should be mentioned that should several functions be interested in interrupting the basic function A at the interruption point 18, this would represent a case of interaction and the control unit 15 would assign continued analysis to the interaction function which deals with the current interaction. When the sub-function B in FIG. 13 obtains permission from the control unit 15 to continue the analysis, as represented by the arrow 21, the analysis continues in the sub-function B at an interruption point 22 and continues in an analysis step 23 until a new interruption point 24 is reached. When this interruption point 24 is reached, the sub-function B reports this to the control unit 15, as illustrated schematically by the arrow 25. The control unit 15 receives the analysis result and searches through its tables (described in more detail below) for those functions which are potentially interested in entering and interrupting the sub-function B at the interruption point 24. It is assumed in the illustrated example that the sub-function D is potentially interested in entering and interrupting the sub-function B. The control unit 15 first sends a query to the sub-function D enquiring whether or not sub-function D will enter and interrupt the sub-function B. The sub-function D makes its own analysis, in order to establish whether it definitely wishes to interrupt the sub-function B. There may be some other analysis results and partial states that the sub-function D will check first, before being able to answer the query definitely. In the illustrated example, it is assumed that the sub-function D will enter and interrupt the sub-function B. The control unit 15 receives a corresponding reply and then transmits a signal, arrow 26, to the sub-function D. The signal 26 informs the sub-function D that it may take over the analysis. The sub-function D now begins an analysis at an interruption point 27. This analysis step is referenced 28. The analysis step 28 is terminated at an interruption point 29. The analysis result is sent to the control unit 15, which in the case of the illustrated embodiment sends the analysis result 30 to the sub-function B, via the schematically illustrated arrow 31. A new analysis step 32 is started in the sub-function B, at a new interruption point 33 in said sub-function B. The result of the analysis step 32 is sent to the control unit 15, as indicated schematically by the arrow 34. The analysis result 34 is sent by the control unit 15 back to the basic function A. There is now started in the basic function A a new analysis step 36 which starts from the interruption point 18 and which uses the new analysis result 35 as a starting point for the continued analysis, instead of the old analysis result 20. When the analysis step 36 terminates at the interruption point 19, the aforedescribed procedure is repeated by reporting the analysis result from the interruption point 19 to the control unit 15, whereby the control unit 15 searches its tables for other sub-functions that are interested in entering and interrupting the basic function. It is assumed in the illustrated case that no further sub-functions are interested in interrupting the basic function A at the interruption point 19.

The example illustrated in FIG. 13 shall not be interpreted as necessitating a jump in the analysis chain belonging to the sub-function B because of the fact that the sub-function D lies on a higher level than the sub-function B. The example illustrated in FIG. 13 is just only an example. For instance, the opposite may be the case, such that the analysis result at arrow 31 is forwarded to the interruption point 24 and the analysis result 35 is forwarded to the interruption point 19.

Thus, when the analysis continues with the analysis step 36 in the basic function A, some of the parameters from the analysis result of the analysis step 17 have changed and the analysis continues in the analysis step 36 with these changed parameters. The analysis then continues in the basic function A in analysis steps 37, 38 and 39 and no other sub-function wishes to enter and interrupt the analysis at any of the interruption points that are associated with respective analysis steps. Upon completion of the analysis chain in the basic function A, all of the operations which shall perform the state changes that are required for the current state in combination with the current input signal K have been identified. If a new output signal shall be produced, those operations that produce this output signal will also have been determined. The analysis phase is therewith terminated and it is not until now that the operation phase begins in which the state changes are effected and the output signal, when relevant, is produced.

It is also evident from the aforedescribed example that there is found for each combination of state and input signal a process which generates a new state or, depending on the combination concerned, retains the existing state and generates at least one output signal, or depending on the combination concerned does not generate an output signal. For this reason, "output signal" and "state change" have been placed in square brackets in FIG. 13.

Figure 14A:
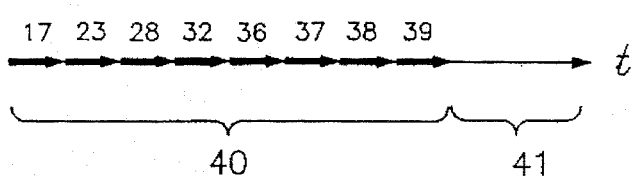
FIG. 14A is an example of a time diagram illustrating the division into an analysis phase and an operation phase.
Figure 14B:
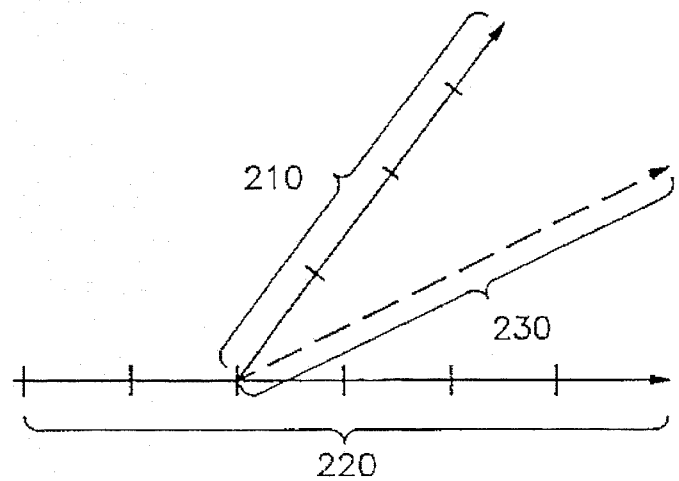
FIG. 14B is a diagram illustrating an analysis sequence and two branches from said sequence caused by two optional functions desiring to effect a supplementary analysis.

It will also be evident that the example shows that the process which produces the aforesaid result is divided into an analysis phase and an operation phase. This has been illustrated in FIG. 14. The analysis phase is referenced 40 and the operation phase is referenced 41. The analysis steps are plotted along a time axis t, and the operation phase 41 is commenced upon completion of all analysis steps. Although FIG. 14 is described with particular reference to FIG. 13, it will be understood that in accordance with the principles of the invention, each process of the aforesaid kind is divided into an analysis phase and an operation phase, irrespective of what the individual sub-functions are. The result of such a process may be a new partial state and an output signal, a new partial state in the absence of an output signal, the retention of a current partial state, i.e. the partial state is not changed, and the delivery of an output signal or, as is possible, the retention of the same partial state in the absence of a generated output signal.

Figure 15:
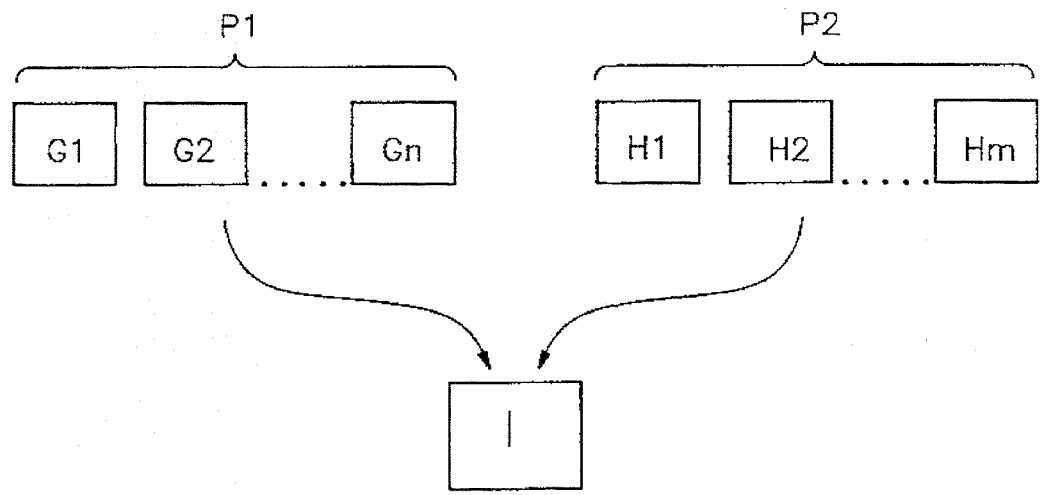
FIG. 15 is a diagram which illustrates the manner of operation of an interface function.

Before describing the manner in which the control unit 15 operates when connecting a sub-function via the unitary interface 16, there will first be described a novel type of sub-functions, called interface sub-functions, abbreviated to interface functions, with reference to FIG. 15. An interface function is a particular type of basic function which enables a sub-function, referred to as the subject sub-function, to refer to one or more sub-functions selected from a specified group of sub-functions, without the subject sub-function having knowledge of all specific sub-functions in the specified group. Two sub-function groups P1 and P2 are shown in FIG. 15. The sub-functions in group P1 are referenced G1, G2, . . . Gn, where n is any desired integer. The sub-functions in group P2 are referenced H1, H2, . . . Hm, where m is any desired integer. The reference I identifies an interface function. None of the sub-functions in group P1 has knowledge of an individual sub-function in group P2; they are only aware of the existence of the group P2. The same applies to the sub-functions in group P2; they have no knowledge of the individual sub-functions in group P1. The difficulty is now that individual sub-functions in the one group shall be able to cooperate with individual sub-functions in the other group. Another difficulty is that the number of sub-functions in each group may differ from day to day. In other words, n and m can vary in time. It shall thus be possible to add a sub-function to group P1 and any one of the sub-functions in group P2 shall be able to call this sub-function without being aware of its existence. These difficulties are resolved by providing, in a sub-function I, referred to as an interface function, an interruption point that is common to the sub-functions in both groups P1 and P2. When the field of application is telephony, group P1 may be a group of administrative sub-functions that are used by an operator, for instance a telephone authority, and the group P2 may be a group of subscriber services to which subscribers may subscribe. For instance, G1 may be the service "connection of subscriber service", G2 "disconnection of subscriber service". Other examples of administrative services are "subscriber connection", "subscriber release" and "changing billing information". Examples of parameters in administrative services are subscriber number and category affiliation. H1 is, for instance, "diversion", H2 "diversion-on-busy". The common interruption point used may, for instance, be "attempt to connect to a certain subscriber number", which is inserted into the interface function I. If the operator wishes to connect-up, for instance, the service "diversion" on a subscriber number, the operator activates the sub-function G1 "connection of subscriber service" and sends certain parameters to this sub-function, among other things, the subscriber number and the category affiliation (=among other things, the designation of the service). This information is sent to the interface function as the analysis result, and several sub-functions in group P2 will then immediately report their interest in entering and interrupting. More specifically, the interested sub-functions are those who have "attempt to connect to certain subscriber numbers as an interruption point". Of those sub-functions that have expressed such interest, it is the "diversion" H1 which the control unit permits to enter and connect to the stated subscriber number.

Although only two groups P1 and P2 have been described above, it will be understood that more than two groups may be present in conjunction with interface functions. Furthermore, although only one common interruption point has been used in the described interface function, it will be understood that more than one may be used. For instance, in the described embodiment, the interruption point "connection successful" can be inserted into the interface function. When H1 has connected with the stated subscriber number, H1 can report this back to the interface function I. This interruption point is discovered, inter alia, by G1, which then obtains confirmation that the connection has been effected.

Finally, it can be mentioned that similar to a basic function, an interface function does not require any other specific sub-function. An interface function can therefore be said to be a particular type of basic function.

The function of the control unit will now be described with reference to the connection of a sub-function. Reference is made to FIGS. 16A–16D when concerning the connection of a basic function or of an optional function and to FIGS. 16E–16F when concerning the connection of an interaction function, and to FIGS. 16G–16H when concerning the connection of an interface function.

FIGS. 16A–16H are flow sheets which read from left to right and from top to bottom. The headings on each sheet disclose whether the described processes are effected in a sub-function or in the control unit 15. The broken lines extending between the various blocks represent signals. The circles indicate different program states.

Figure 16A:
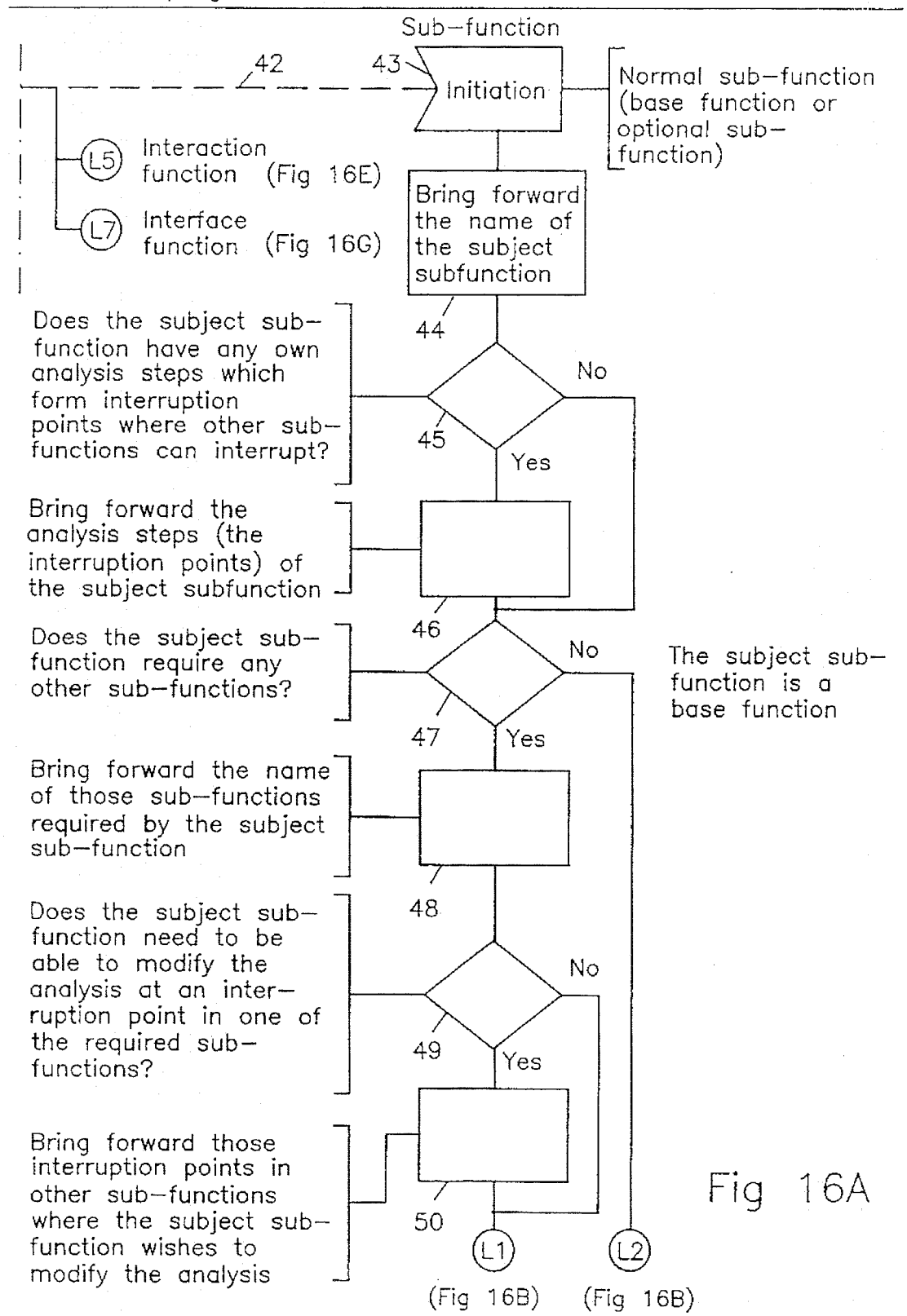
FIGS. 16A–16H are flow sheets which illustrate the manner of operation of the control unit when connecting a sub-function to the device shown in FIG. 12.

A sub-function is activated or set-up in response to a command from an operator which chooses which sub-function shall be connected to the device. The sub-function chosen by the operator receives an input signal 42 which initiates the connection sequence of the sub-function, marked "initiation" in block 43 or block 71 or block 92, depending on the type of sub-function chosen. FIG. 16A describes the connection sequence effected when the sub-function is a normal basic function or an optional function. The connection sequence for an interaction function is described in the program label L5 in FIG. 16E, while the connection sequence for an interface function is described under the program label L7 in FIG. 16G.

In response to initiation, the sub-function selected by the operator, referred to as the subject sub-function in the following, brings forward its own name, as described in block 44. This name is used as future reference to the subject sub-function. This reference can thus be used by other sub-functions which require the subject sub-function. If the subject sub-function has analysis steps of its own, option block 45, these analysis steps will then form interruption points in which other sub-functions can interrupt the analysis proceeding in the subject sub-function. If the subject sub-function has analysis steps of its own, i.e. if the answer to the query in option block 45 is YES, the sub-function brings forward its own analysis steps, i.e. reports its own interruption points, as illustrated in block 46. If the subject sub-function lacks analysis steps, there is no interruption point to report. The connection process is then continued by the subject sub-function reporting if it requires some other sub-functions. This is illustrated in block 47. If the subject sub-function does not require other sub-functions, it is then evident that the subject sub-function is a basic function and program state labelled L2 is reached, which is described with reference to FIG. 16B. On the other hand, if the subject sub-function requires other sub-functions, the subject sub-function must state the names of the sub-functions required, block 48. Thus, in this case, it is obvious that the subject sub-function has a unidirectional dependency to one or more other sub-functions. If the subject sub-function wishes to interrupt the analysis at an interruption point in one of its required sub-functions in order to modify the analysis therein, option block 49, the subject function shall then bring forward the interruption points in those other sub-functions into which the subject sub-function will enter in order to modify the analysis, block 50. If the subject sub-function does not require to modify the analysis in one of those sub-functions required by the subject sub-function, block 50 is skipped and the program label L1 described in FIG. 16B is reached.

Figure 16B:
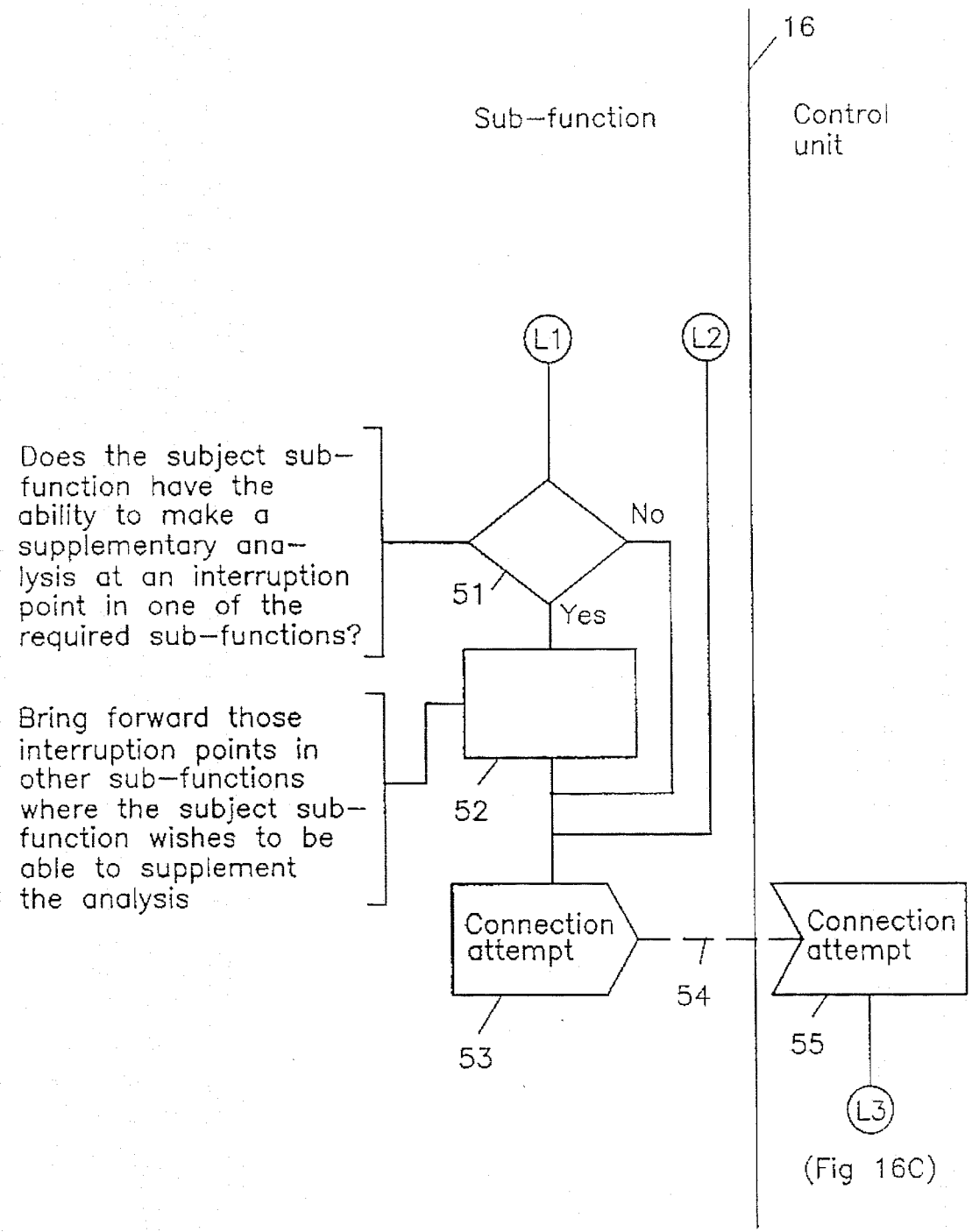

The headings at the top of FIG. 16B disclose that the processes described takes place in the selected sub-function and in the control unit 15 respectively. The connection sequence of the sub-function moves from the program label L1 to investigate whether or not the subject sub-function needs to perform a supplementary analysis at an interruption point in any one of the required sub-functions. This is marked by option block 51. If the subject sub-function wishes to perform such supplementary analysis, it is necessary for the subject sub-function to state those interruption points in the other required sub-functions in which the subject sub-function wishes to enter and supplement the analysis. This is shown in block 52. Block 52 is skipped when the answer to the query in block 51 is NO.

Figure 16C:
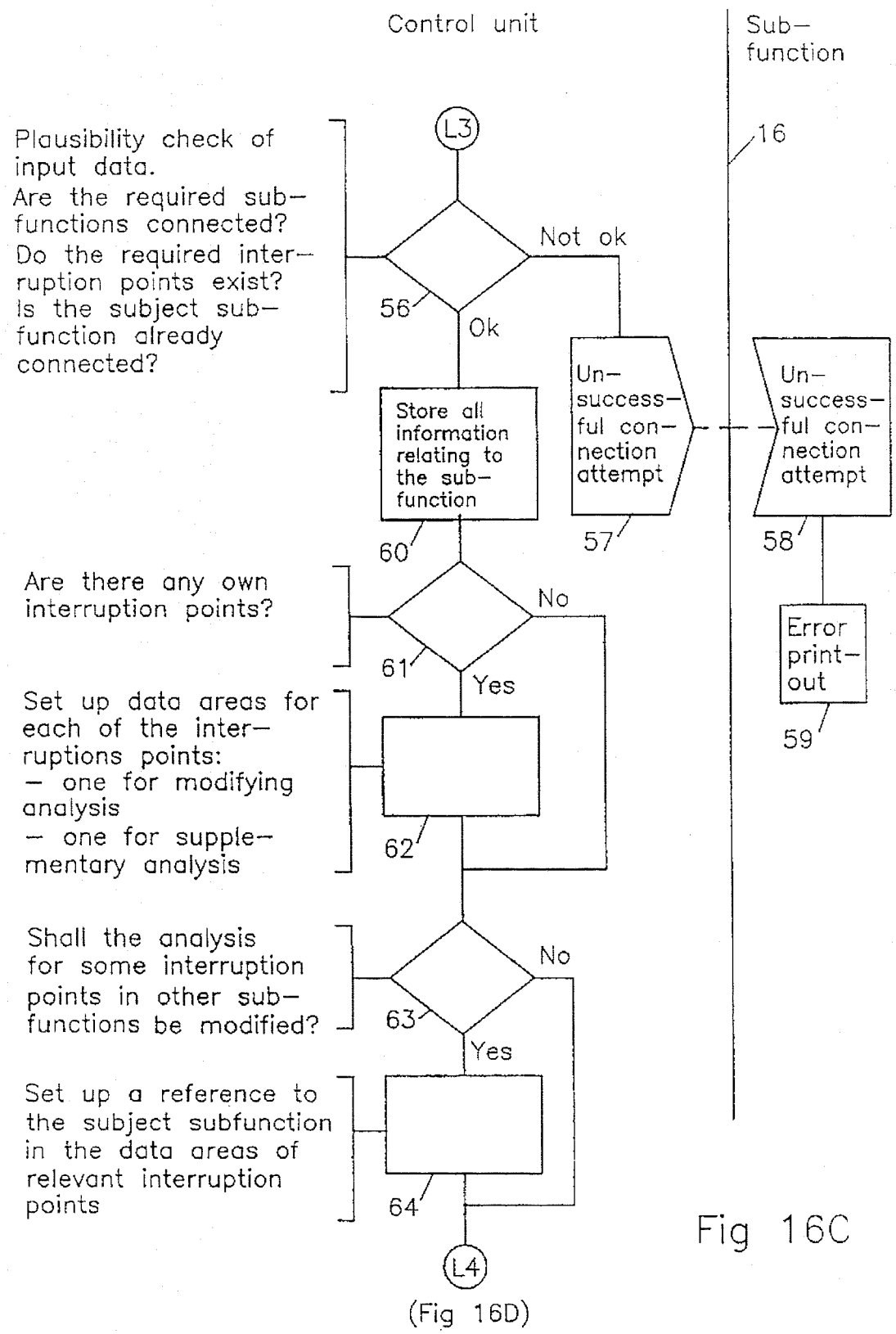
Figure 16D:
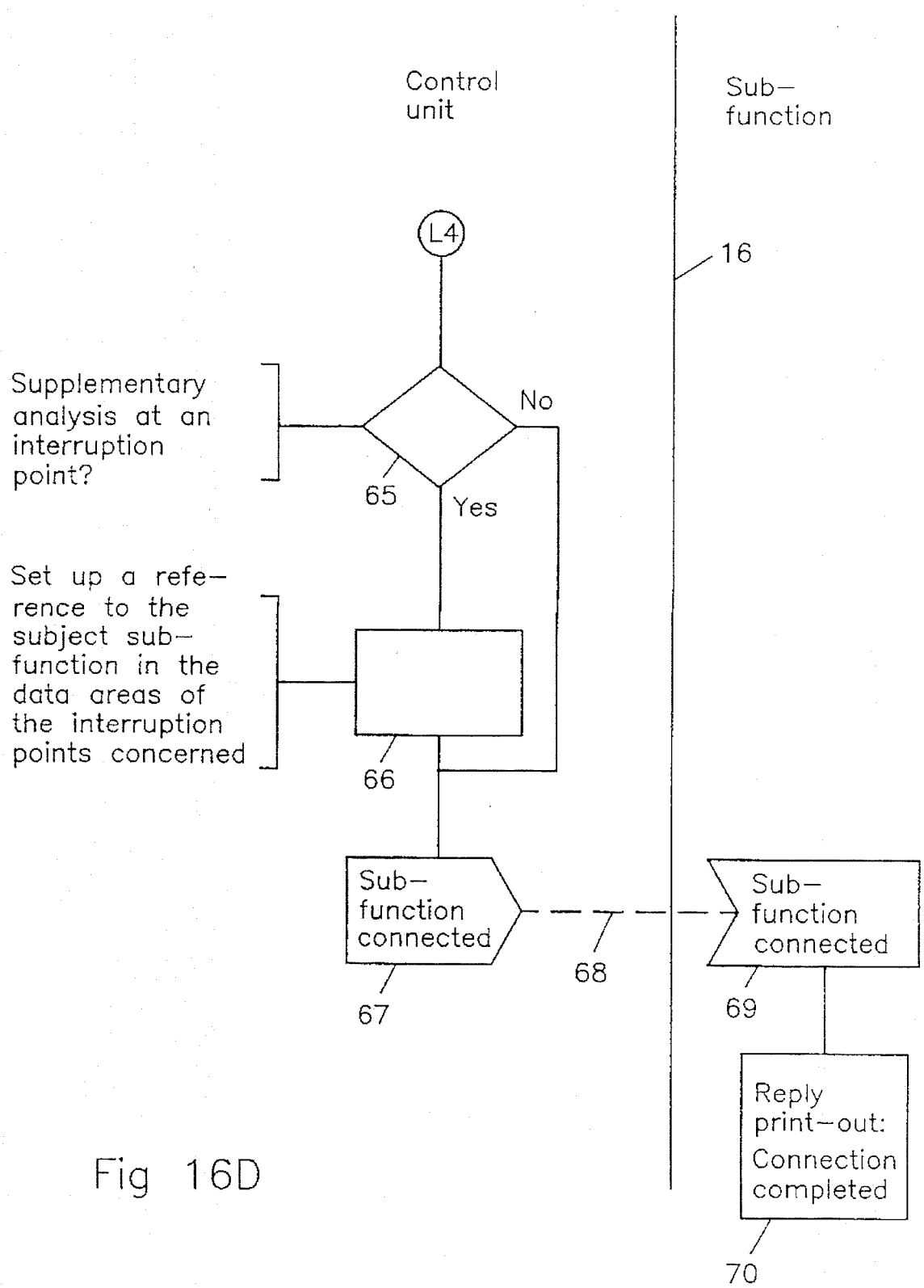

At this stage of the connection sequence, all information needed by the control unit 15 and regarding the sub-function selected by the operator has been collected. The sub-function then makes a connection attempt, block 53, and the aforesaid items of information are sent, represented by the broken line 54, to the control unit 15, as shown in block 55. The program label L3, described in more detail with reference to FIG. 16C, is therewith reached. FIG. 16C shows on the left of the Figure those sequences that are effected in the control unit 15 under the heading control unit, and shows those sequences which take place in the subject sub-function during the connection sequence are shown on the right of the Figure, under the heading sub-function. When the control unit 15 receives a connection call from the subject sub-function according to block 55, the control unit 15 first carries out a plausibility or reasonableness check, option block 56. The plausibility check includes, among other things, a check as to whether or not those sub-functions required by the subject sub-function have already been connected. If it is found that the required sub-functions have not been connected, the connection attempt has failed, block 57, and a signal to this effect is sent to the subject sub-function, block 58. This causes the subject sub-function to initiate a failure message, block 59, on a printer and/or display screen. Other plausibility checks are also carried out, as will be seen from the text at the option block 56.

If the plausibility check carried out by the control unit gives a positive answer, OK in block 56 is stored, the control unit 15 stores all information, data, concerning the subject sub-function in separate data areas in the control unit memory. These data areas are described in more detail below with reference to FIG. 17. All information concerning the service is stored unsorted in a data area 108, shown in FIG. 17. This storage of information is symbolized by block 60 in FIG. 16C. A structuring process then takes place. Initially, it is investigated whether or not the subject sub-function has interruption points of its own, option block 61. If so, the control unit 15 reserves a data area for modifying analysis and a data area for supplementary analysis. It is these data areas that constitute parts of the aforesaid tables. If the subject sub-function has no own interruption points, block 62 is skipped. The subject sub-function may also wish to modify the analysis in other sub-functions at predetermined interruption points. This is decided in block 63. If the subject sub-function wishes to enter and modify the analysis in other sub-functions, the subject sub-function adds a reference to the interruption points at which the subject sub-function is potentially interested to interrupt the analysis, as shown at 109:1 in FIG. 17 and at 117 in FIG. 18. This is shown in block 64. The presence of such a data area in other sub-functions is ensured by the plausibility check and is generated when said other sub-functions is connected. If the subject sub-function does not wish to enter and modify other sub-functions, block 64 is skipped. The program label L4 is then reached. From program label L4, shown in FIG. 16D, the connection sequence steps forward to investigate whether or not the subject sub-function wishes to make a supplementary analysis at an interruption point in other sub-functions. This investigation is represented by option block 65. If the subject sub-function wishes to perform analysis in other sub-functions, it is necessary to inform the other sub-functions to this effect, which is achieved by inserting a reference to the subject sub-function in the data areas of the interruption points concerned; compare 118 in FIG. 18 and 112 in FIG. 17. It will be understood that by the expression data areas of the interruption points concerned is meant the interruption points of the sub-function or functions into which the subject sub-function wishes to enter and effect a supplementary analysis. These references are inserted into said data areas in the step represented by block 66. If the subject sub-function does not wish to make a supplementary analysis, block 66 is skipped. Connection of the sub-function is now complete, block 67, and a signal, represented by the broken lines 68, is sent to the subject sub-function, which now receives confirmation that it has been successfully connected, block 69. A reply to the effect that connection is completed is then printed out, block 70.

Figure 16E:
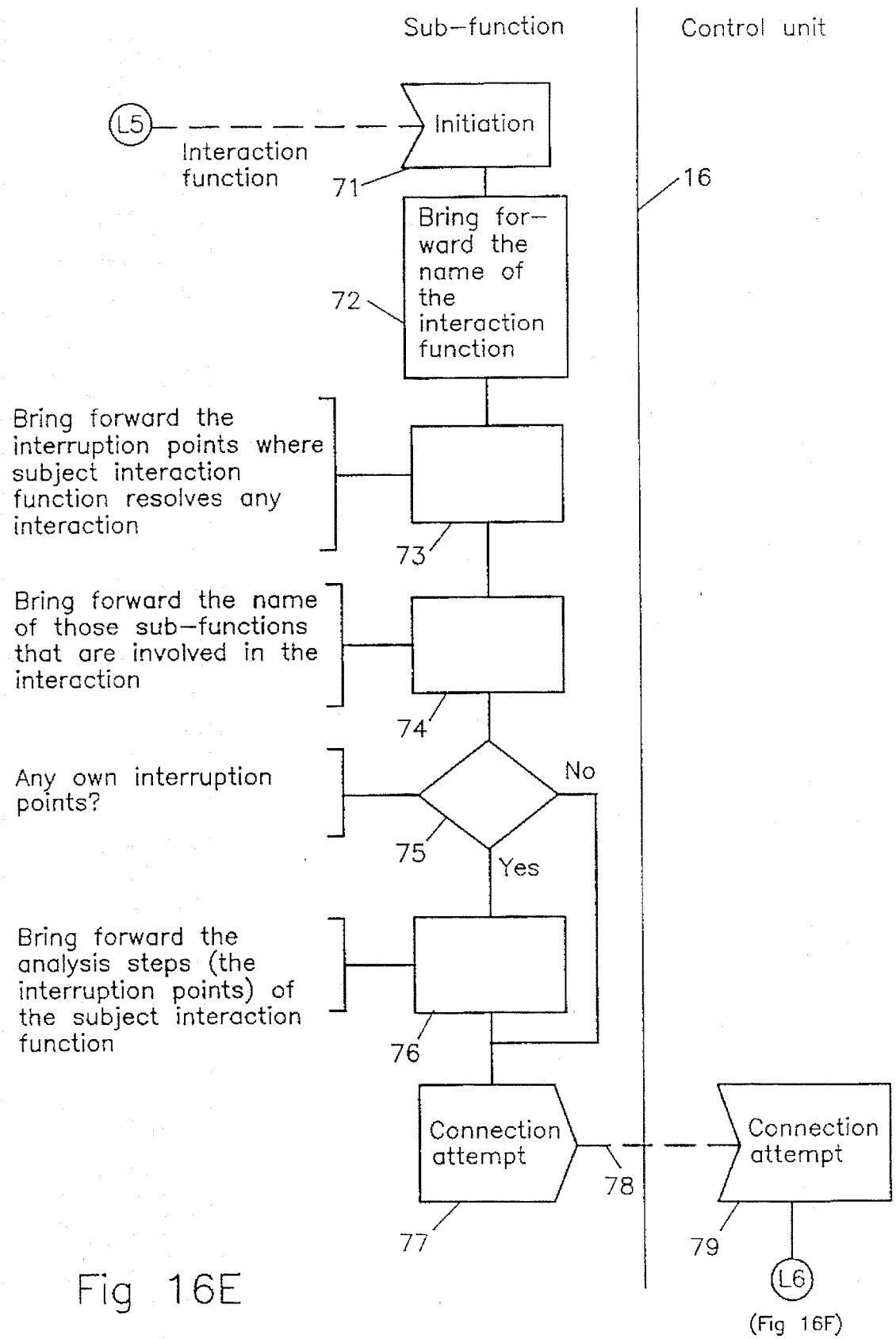
Figure 16F:
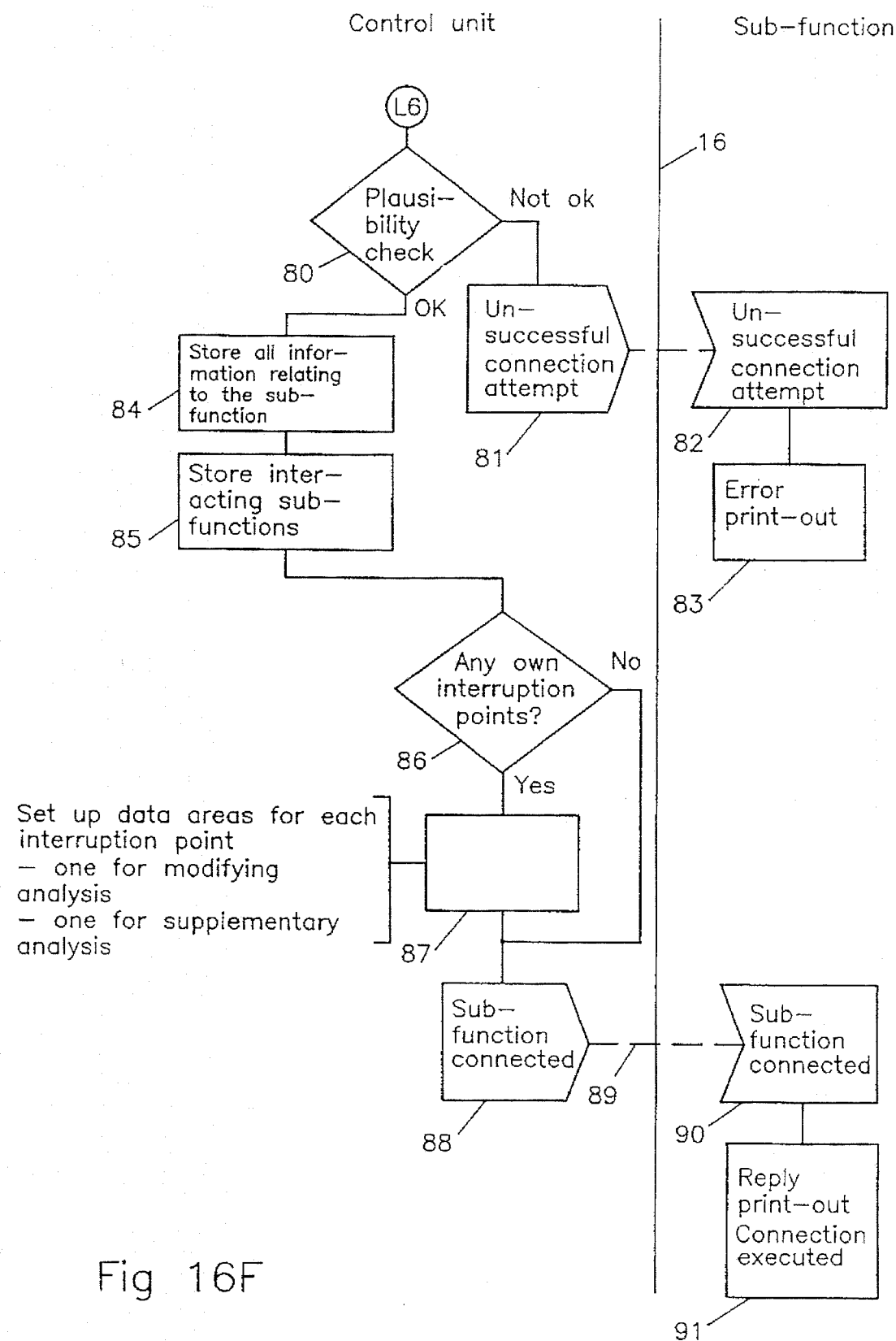
Figure 16G:
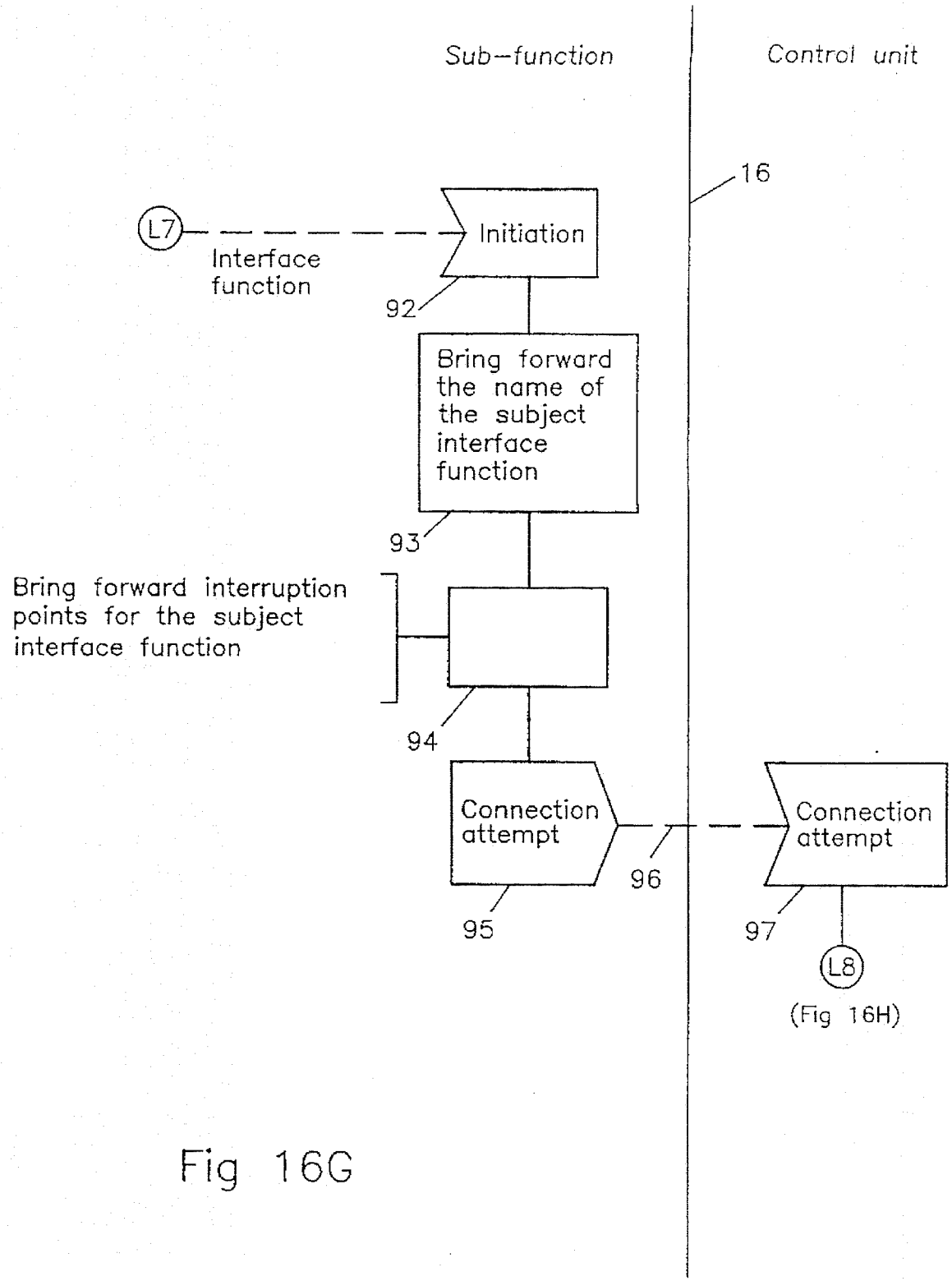
Figure 16H:
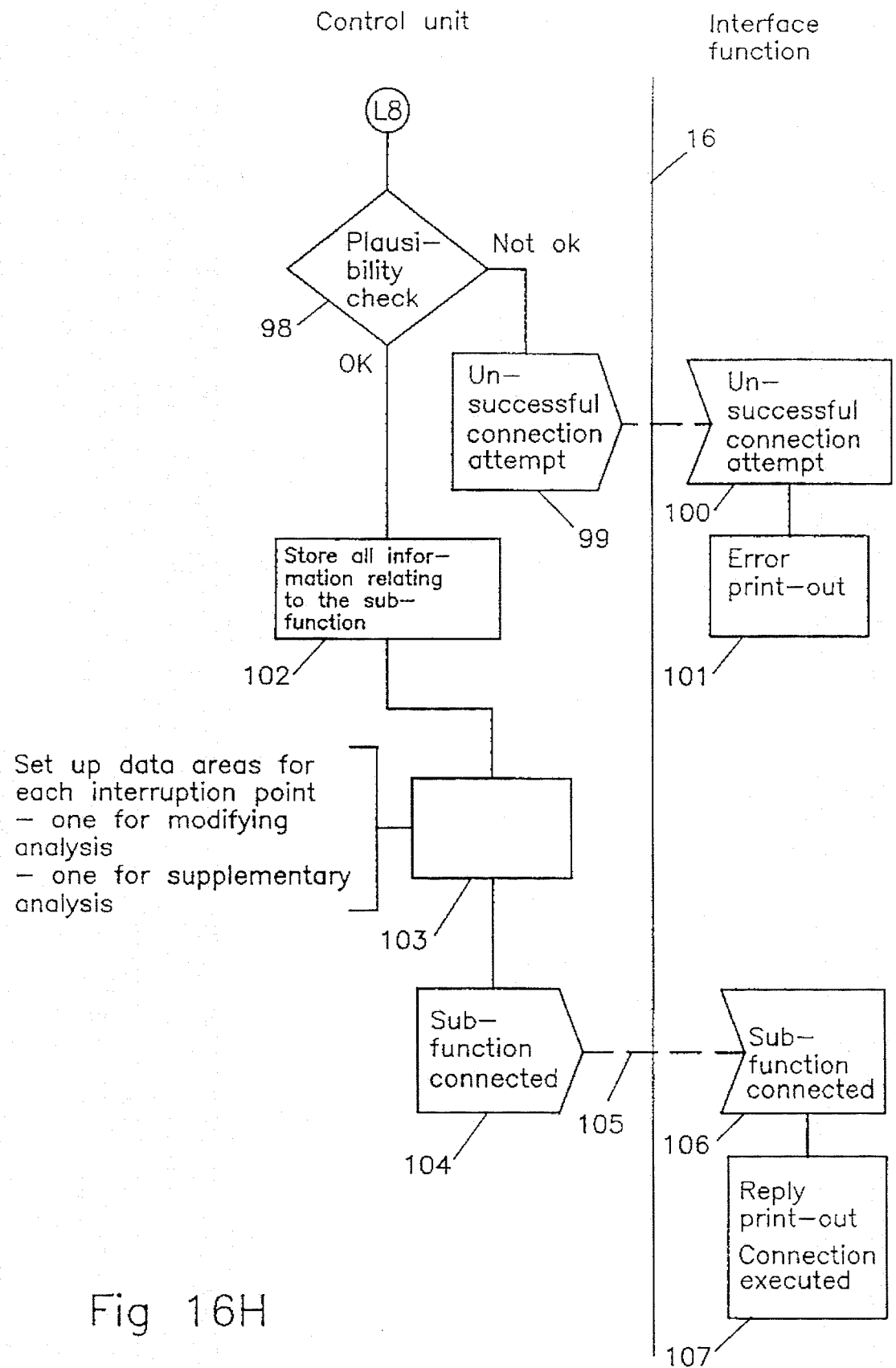

If the command selected by the operator concerns connection of an interaction function, the connection sequence will follow the various process steps described in the flow-sheet presented in FIG. 16E. The connection sequence for the interaction function is started at block 71, which concerns initiation of the connection sequence. The connection sequence is begun by the interaction function bringing forward its name, or identity, block 72. This name is used by the control unit 15 when the control unit wishes to refer to the interaction function. The interaction function then states those interruption points in other sub-functions at which the interaction function resolves any occurrent interaction. This takes place in the process step at block 73. Since a named interruption point can occur in many different sub-functions, it is also necessary to state the name of those sub-functions that are involved in the interaction. This takes place in block 74.

The interaction function may be of an advanced kind and itself have interruption points at which other functions desire to enter and interrupt the analysis. Examples of such advanced interaction functions have been described in the introduction in conjunction with interaction between "diversion" and "diversion-on-busy", where the advanced interaction function directs a question to the A-subscriber and allows the A-subscriber to determine the number to which the call shall be connected. A check is made in block 75 as to whether or not the interaction function has such an advanced nature. If the interaction function has own interruption points, then these must be stated. This is effected in block 76. If the interaction function is not of this advanced type, block 76 is skipped. All information concerning the interaction function has now been brought forward to the control unit 15 and a connection attempt commences, block 77. The information brought forward is signalled, represented by the broken line 78, to the control unit, which receives said information, block 79, therewith reaching the program step L6. The connection sequence continues with the process steps described in FIG. 16F in conjunction with the connection attempt to the control unit.

The control unit 15 commences with a plausibility check on the received information, block 80. This plausibility check is similar to that described with reference to block 56. If the plausibility check has a negative result, Not OK, the connection attempt has failed, block 81, and a signal to this effect is sent to the interaction function, which obtains a message to the effect that the activation attempt has failed, block 82. A failure print-out is made at the same time, block 83. If the plausibility check has a positive result, OK, all information, data, concerning the sub-function is stored in a data area in the control unit memory. This will be described in more detail below with reference to FIG. 17. The storage of information or data is represented by the process step in block 84. Also stored are the references, i.e. the names, of the mutually interacting sub-functions, block 85. The connection process then continues with the control unit checking whether or not the interaction function is of an advanced type and has interruption points of its own, option block 86. If the interaction function has interruption points, data areas are set-up for each such interruption point. More specifically, first data areas are set-up for interruption points at which modifying analysis shall be carried out, and second data areas are set-up for interruption points at which supplementary analysis shall be carried out. This takes place in the process step in block 87. When the interaction function is not of the advanced type, the process step 87 is skipped. The interaction function is now connected, block 88, and a message to this effect is signalled to the interaction function, as shown schematically by the broken line 89. The interaction function receives the message that it is connected, block 90 whereafter a reply printout is made disclosing that connection has been achieved, block 91.

If the operator select the command which concerns the connection of an interface function, program label L7 in FIG. 16A, the connection sequence is much simpler, since an interface function is a very simple function which has only one name and only a few interruption points that are common to other sub-functions. The connection sequence is initiated, block 92, by an operator command and begins with the interface function bringing forward its own name, block 93. The interface function then discloses its own interruption points, block 94. These interruption points are common to two or more groups of sub-functions and have been described above with reference to FIG. 15.

All information that the control unit requires has now been obtained from the interface function and an attempt to connect the interface function to the control unit is made. The information or data brought forward is signalled, represented by the broken line 96, to the control unit 15. The control unit 15 receives this information and recognizes that an attempt is being made to establish a connection, block 97. The program label L8 has now been reached and the connection sequence continues in the manner described in the flowsheet of FIG. 16H. The control unit makes a plausibility check of the receiver data, block 98. If the plausibility check has a negative result, the connection attempt has failed, block 99, and a report to this effect is sent to the interface function, block 100. A report to the effect that the connection attempt has failed is also printed-out, block 101. If the plausibility check has a positive result, OK, all information, data, concerning the interface function is stored in reserved data areas in the control unit, in a manner described in more detail herebelow. This storage of information is effected in the step represented by block 102. In the same way as with other sub-functions, the control unit sets-up data areas for each interruption point owned by the interface function, more specifically a first group of data areas for modifying analysis and a second group of data areas for supplementary analysis. This reservation takes place in block 103.

The interface sub-function is now connected, block 104, and the control unit reports this to the interface sub-function, as indicated by the broken line 105. The interface sub-function receives a report that it is connected, block 106, and a reply print-out confirming the connection is made, block 107.

Figure 17:
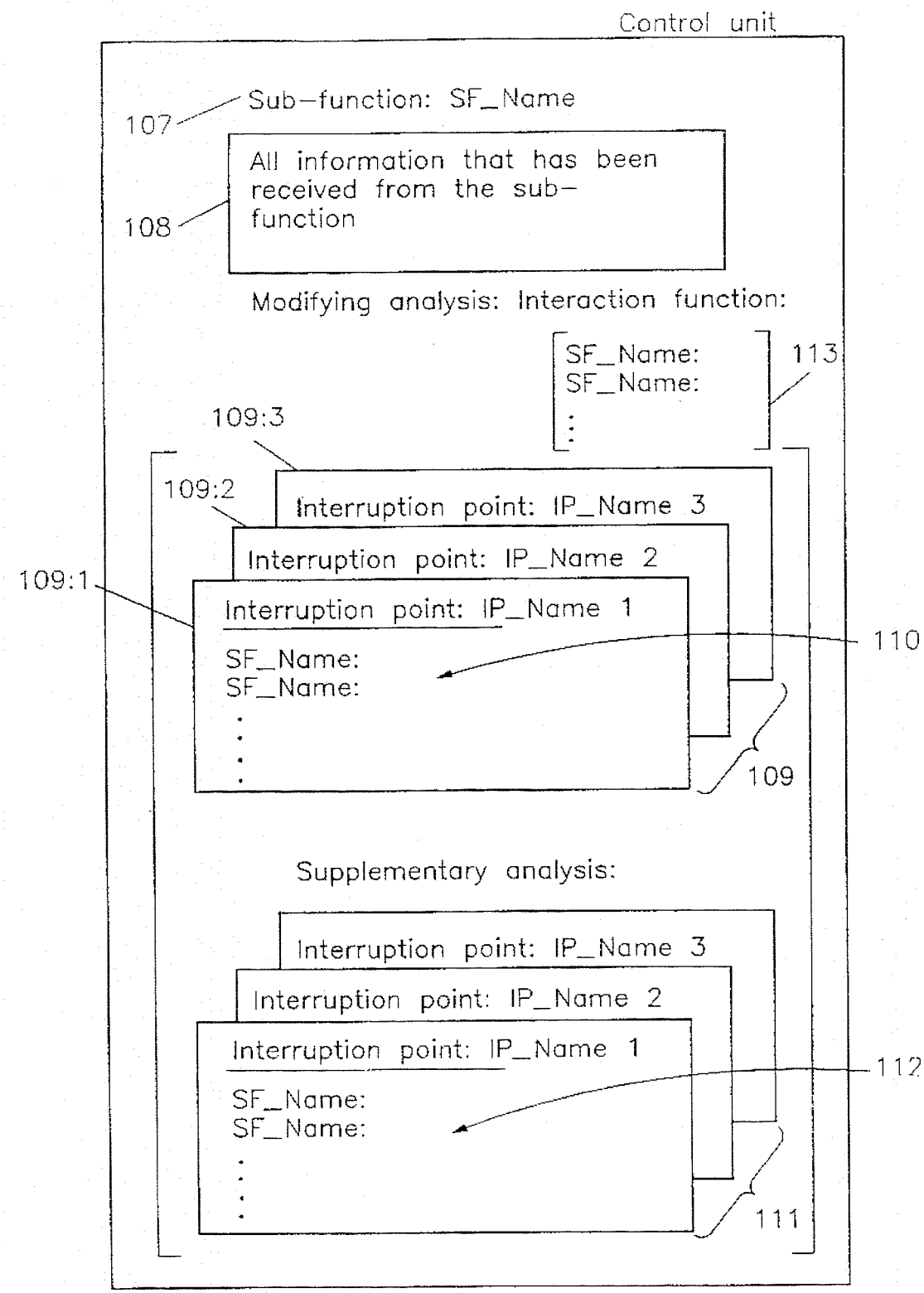
FIG. 17 illustrates data areas that are created by the control unit in FIG. 12 in conjunction with connecting a sub-function to the device.

FIG. 17 illustrates schematically the various data areas generated by the control unit 15 when connecting a sub-function, referred to as the subject sub-function. The Figure also discloses the information stored in the various data areas. The name, SF_name, of the sub-function present during the connection sequence is stored in a first data area 107. FIG. 17 can be considered as a data record relating to the subject sub-function whose name is given in the data area 107. The control unit stores in another data area all information that has been received from the subject sub-function upon connection thereof. The analysis steps of the subject sub-function and its interruption points in other sub-functions required by the subject sub-function are examples of information stored in the data area 108. By the subject sub-function is thus meant the sub-function that is stated in the data area 107. Although not necessary, a subject sub-function may exhibit interruption points of its own, IP_Name1, IP_Name2, IP_Name3 . . . , at which other sub-functions wish to enter and interrupt the subject sub-function analysis. The control unit reserves a data area 109 for each such own interruption point IP_Name1, IP_Name2, IP_Name3 . . . If the subject sub-function has three own interruption points IP_Name1, IP_Name2, IP_Name3, then three data areas 109:1, 109:2 and 109:3 are reserved, one for each interruption point. The name, SF-Name, of the sub-function or the other sub-functions that is/are interested in entering and interrupting the analysis in the subject sub-function given under 107 is stored in each data area 109:n (n=1, 2, 3). Thus, when a new sub-function is connected and the new sub-function wishes to enter and interrupt the analysis in the sub-function given in the data area 107, the name of the sub-function present during the connection process is written into a corresponding data area 109. When another sub-function, different from the aforementioned, is connected to the control unit and states that it wishes to enter and interrupt the analysis at an interruption point in the sub-function given under the data area 107, the name of this new sub-function will be inserted into the data area that corresponds to the interruption point concerned. Ultimately, a number of different names may be included in the data area 109:1, another number and other, different sub-function names in data area 109:2, and so on. This filling-up of the data area as new sub-functions are connected is illustrated by the arrow 110. The subject sub-function may also have interruption points at which other sub-functions wish to enter and effect a supplementary analysis. The control unit reserves a correspondingly large number of data areas 111 for each such interruption point. When a new sub-function is then connected to the device and wishes to effect a supplementary analysis in the sub-function that is given in the data area 107, this new sub-function is permitted to state the interruption points it is interested to use for the supplementary analysis, and the control unit then stores the name of the new sub-function in the data areas of the interruption points concerned. In this way, the names of the interested sub-functions are filled-in at the interruption points concerned as new sub-functions are added. This successive infeed of the names of new sub-functions is indicated by the arrow 112. The square brackets shown in FIG. 17 denote that the data areas can be present, although not necessarily so. If the sub-function to be connected, the name of which is stored in the data area 107, is an interaction function, the control unit reserves a data area 113 in which the names, SF names, of the mutually interacting sub-functions are stored. The information stored in the data area 113 is used by the control unit 15 to run a check among the connected sub-functions with the intention of ascertaining whether or not there is an interaction function which resolves the conflict that occurs when two or more sub-functions simultaneously wish to take over the analysis in one and the same interruption point in a sub-function.

FIG. 18 illustrates how a sub-function is structured in accordance with the invention. FIG. 17 can be placed appropriately adjacent FIG. 18, in order to see how different pieces of information from a sub-function is stored in other existing sub-functions in conjunction with the connection of the sub-function shown in FIG. 18 by the control unit 15. Similar to FIG. 17, the square brackets in FIG. 18 show that the units presented may be present, although not necessarily so.

The name of the individual sub-function, referred to as the subject sub-function, is given in a first data area 114. In addition, at least one of the following pieces of information is also given, depending on the nature of the subject sub-function:

a) Own analysis steps performed in the subject sub-function and the interruption points of these steps. The interruption points are identified by the name IP_name. These items of information are symbolized by a data area 115 contained within square brackets.

b) Names of other sub-functions that are required by the subject sub-function. These items of information are stored in a data area 116, which is also contained in square brackets. These items of information are used primarily in conjunction with the aforedescribed plausibility check that is carried out when connecting the subject sub-function to the device with the aid of the control unit 15.

c) The interruption points in other sub-functions that are required by the subject sub-function. These interruption points are used for modifying the analysis. The interruption points concerned are identified by the name IP_name. These items of information are stored in a data area 117. It is these items of information that are copied to the data areas 109 in FIG. 17 when the sub-function given under the data area 114 is connected. Copying of this information is symbolized by the arrow 110 in FIG. 18, this arrow 110 thus corresponding to the arrow 110 in FIG. 17.

d) The interruption points in other sub-functions that are required by the subject sub-function. More specifically, the interruption points that are used to effect supplementary analysis. These items of information are stored in a data area 118 and are copied into the data areas 111 in FIG. 17 when the subject sub-function named under the data area 114 is connected. This copying or transference of information is symbolized in FIG. 18 by the arrow 112, which corresponds to the arrow 112 in FIG. 17.

By definition, a basic function cannot include data of the kind symbolized by the square brackets around the data areas 116 and 117. On the other hand, software logic is always present to carry out analyses and operations. Such software logic is stored in a data area 119. Own analysis steps are stored in the data area 115.

An optional function will always contain own analysis and, by definition, always requires other sub-functions. Thus, information items are always stored in the data areas 116. Items of information are stored either in the data area 117 or in the data area 118, or in both areas.

An interaction function always has functions as intimated by the square brackets 116 and 117.

In addition to its name, an interface function will contain solely data according to the square brackets 115.

The general function of the control unit will now be described in more detail with reference to FIGS. 19A–19I. The FIGS. 19A–19I are flow sheets. It is a prerequisite that one or more sub-functions have been connected. Each flow sheet describes a sequence of events that take place in either a sub-function or the control unit.

Figure 19A:
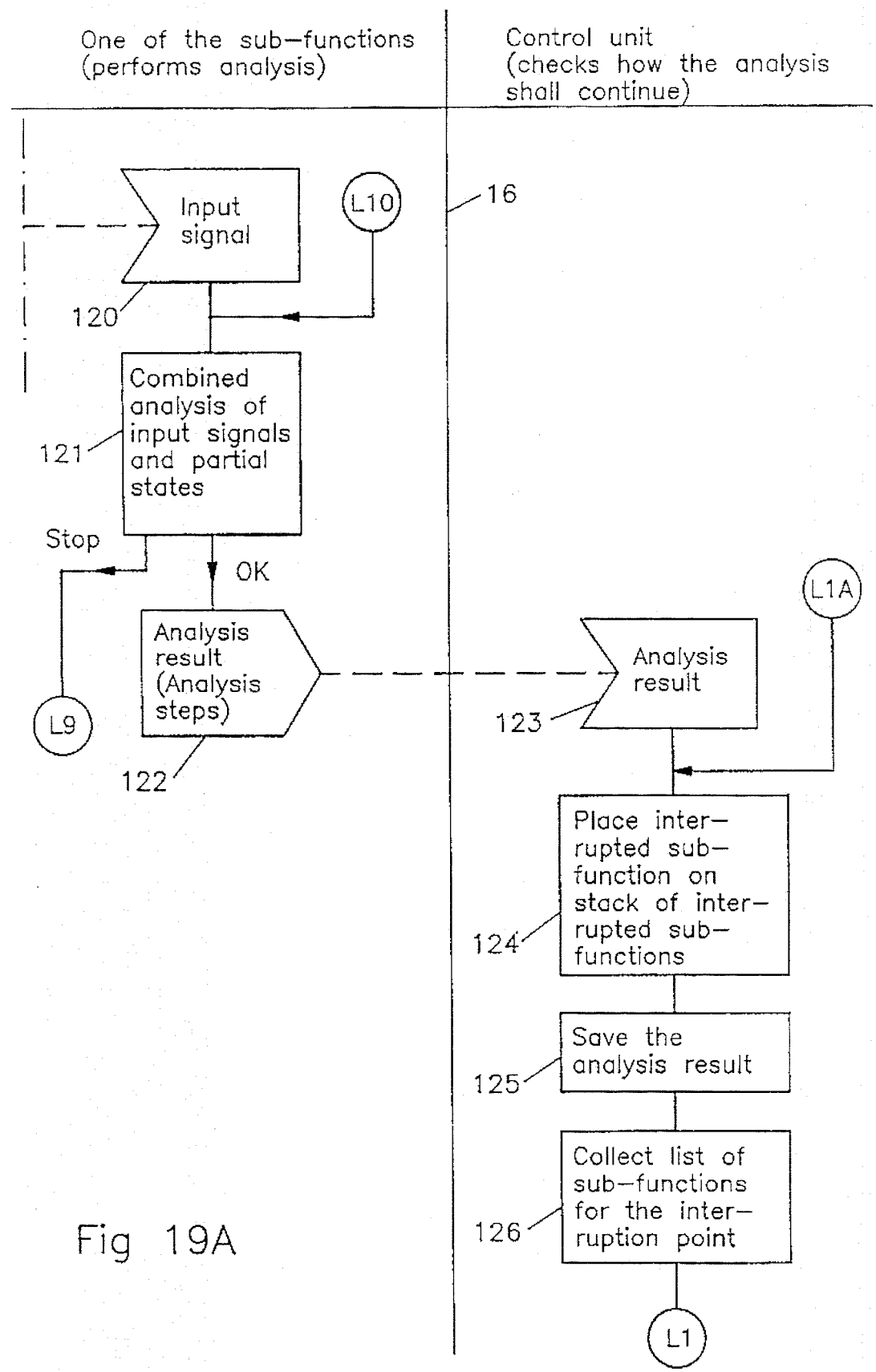

The connected sub-functions reach a given state at a given point in time. This state is divided into partial states of the various sub-functions. In FIG. 19A, one of the sub-functions, referred to as the subject sub-function, is assumed to receive an external stimulus, called input signal, as shown in block 120. When subject sub-function receives the input signal, there is begun a combined analysis of input signal and partial state, block 121. Block 121 illustrates the first step in the analysis after receiving the input signal and is the analysis step that involves analyzing the smallest quantity of partial states in combination with input signal in order to give an analysis result. Upon completion of the first analysis step in the subject sub-function, a signal is sent to the control unit, block 122, which receives the analysis result. The signal contains one or more analysis results. The program label L9, the blocking output from block 121, is reached solely when the partial states have been protected, i.e. protections have been placed on the partial states, and a collision with other analysis sequences is imminent. When the analysis result arrives at the control unit, block 123, via the interface 16, there is commenced in the control unit a program sequence which keeps an account of the sub-function or sub-functions that have been interrupted. In the illustrated case, the subject sub-function has been interrupted. The interrupted sub-function is placed on a stack for interrupted sub-functions, block 124. The stack may contain several interrupted sub-functions, since interruptions take place successively. The analysis result of the interrupted sub-function is also inhibited, block 124. The sum of all analysis results shall finally decide the procedure to be reached by the control unit. The control unit then moves to the process according to which the control unit finds out those other sub-functions that are potentially interested in interrupting the subject sub-function. To this end, the control unit 15 refers to its table 109, FIG. 17, and brings-up the list of the potentially interested sub-functions. This takes place in block 126. Program label L1 is therewith reached. From program label L1 in FIG. 19B, the control unit 15 moves to check whether or not there is any sub-function that is potentially interested in interrupting the subject sub-function analysis, options block 127. If the result is "no", i.e. the table 109 is empty, a move is made to program label L2, as described in FIG. 19D, to check whether or not there is found a sub-function which is potentially interested in performing a supplementary analysis. If there is found a sub-function that is potentially interested in interrupting the analysis proceeding in the subject sub-function, the control unit brings forward this sub-function, block 128, from its list 109 and checks, options block 129, whether or not the sub-function truly wishes to interrupt, by sending a signal and asking the potentially interested sub-function whether it wishes to interrupt or not. The control unit will then be answered yes or no. If the sub-function answers "yes", the control unit marks the sub-function as wishing to interrupt the analysis of the subject sub-function, option block 130. The control unit then asks as to whether further sub-functions in the list 109 are interested in interrupting, block 131. If such sub-functions are found, the next potentially interested sub-function is brought forward by the control unit, block 132. The control unit continues in this way, until all potentially interested sub-functions listed in the table have been investigated. The block program label L9, can occur when certain partial states are protected, i.e. when these partial states are already involved in another, ongoing analysis. When all sub-functions in the list 109 have been dealt with, the control unit checks whether any of the potentially interested sub-functions actually wish to interrupt, block 133. Three cases can now occur. Either none of the sub-functions wishes to interrupt, whereupon program label L2, FIG. 19D, is reached. If a sub-function wishes to interrupt the analysis, a test is run in option block 134 to ascertain whether one or more sub-functions wish to interrupt. If only one sub-function wishes to interrupt, program label L3 is reached, as described in FIG. 19E, whereupon the control unit 15 brings forward the analysis result and the interrupted sub-function (from steps 124–125), block 135 in FIG. 19E.

Figure 19B:
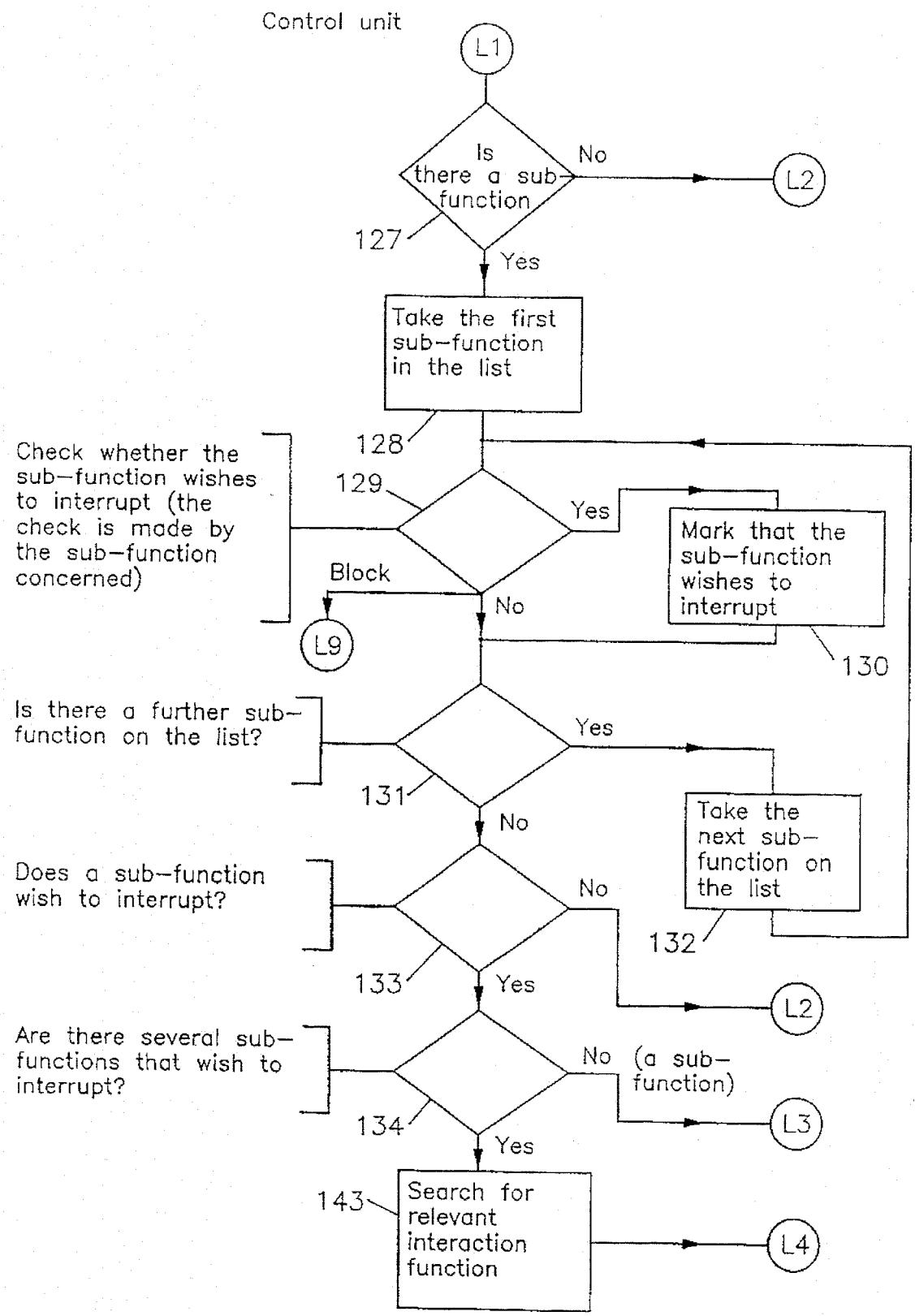
Figure 19C:
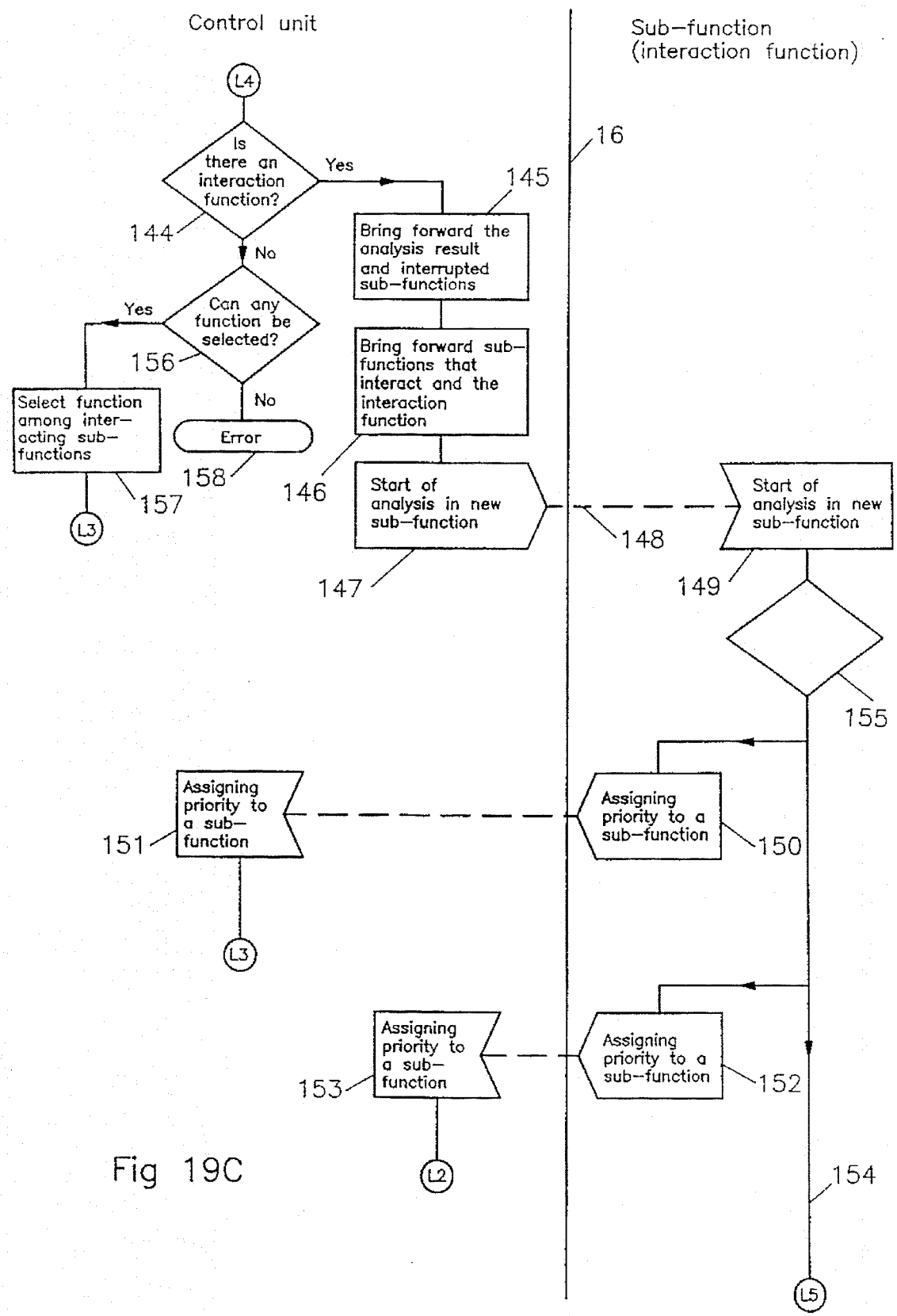
Figure 19D:
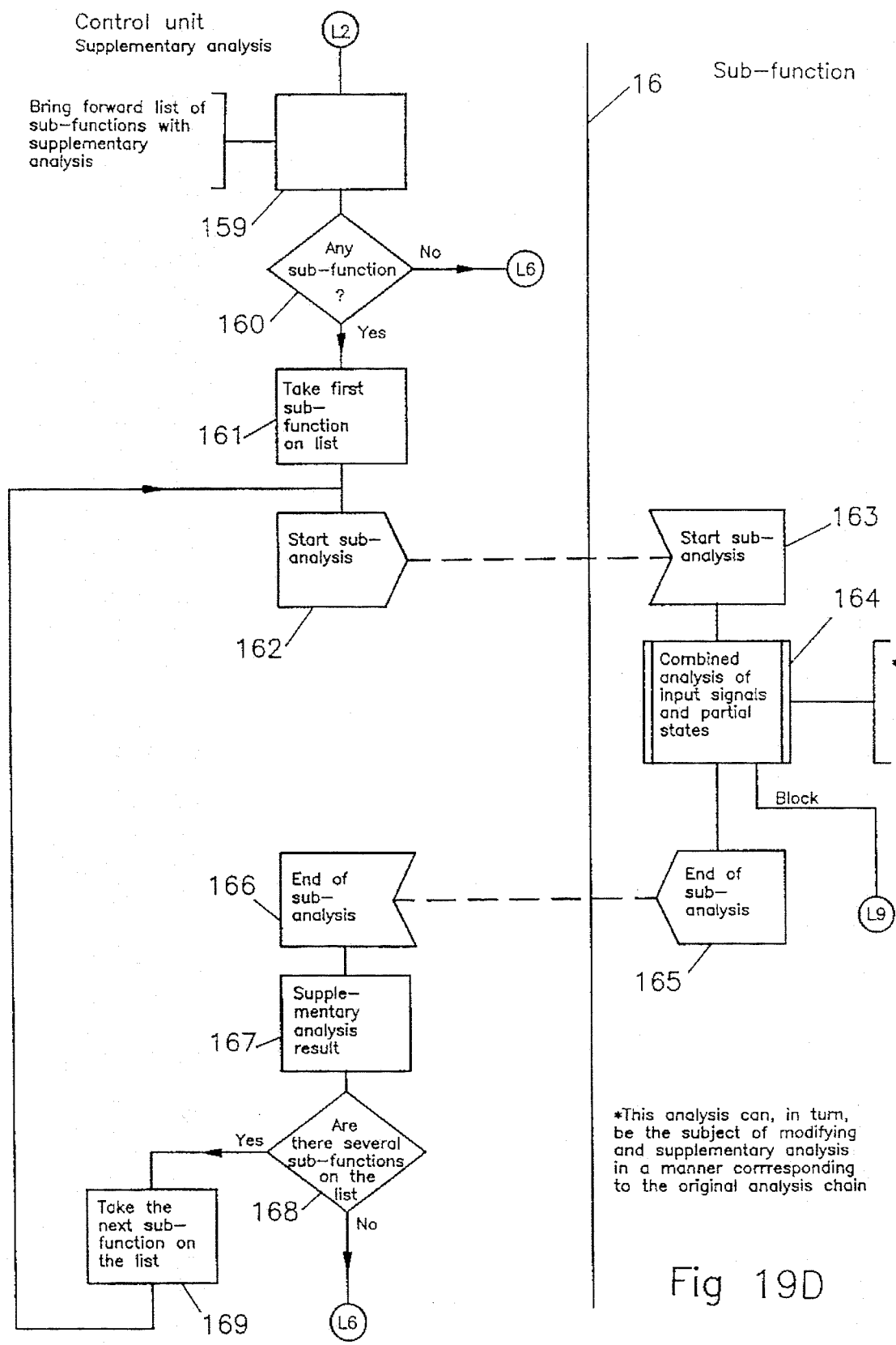
Figure 19E:
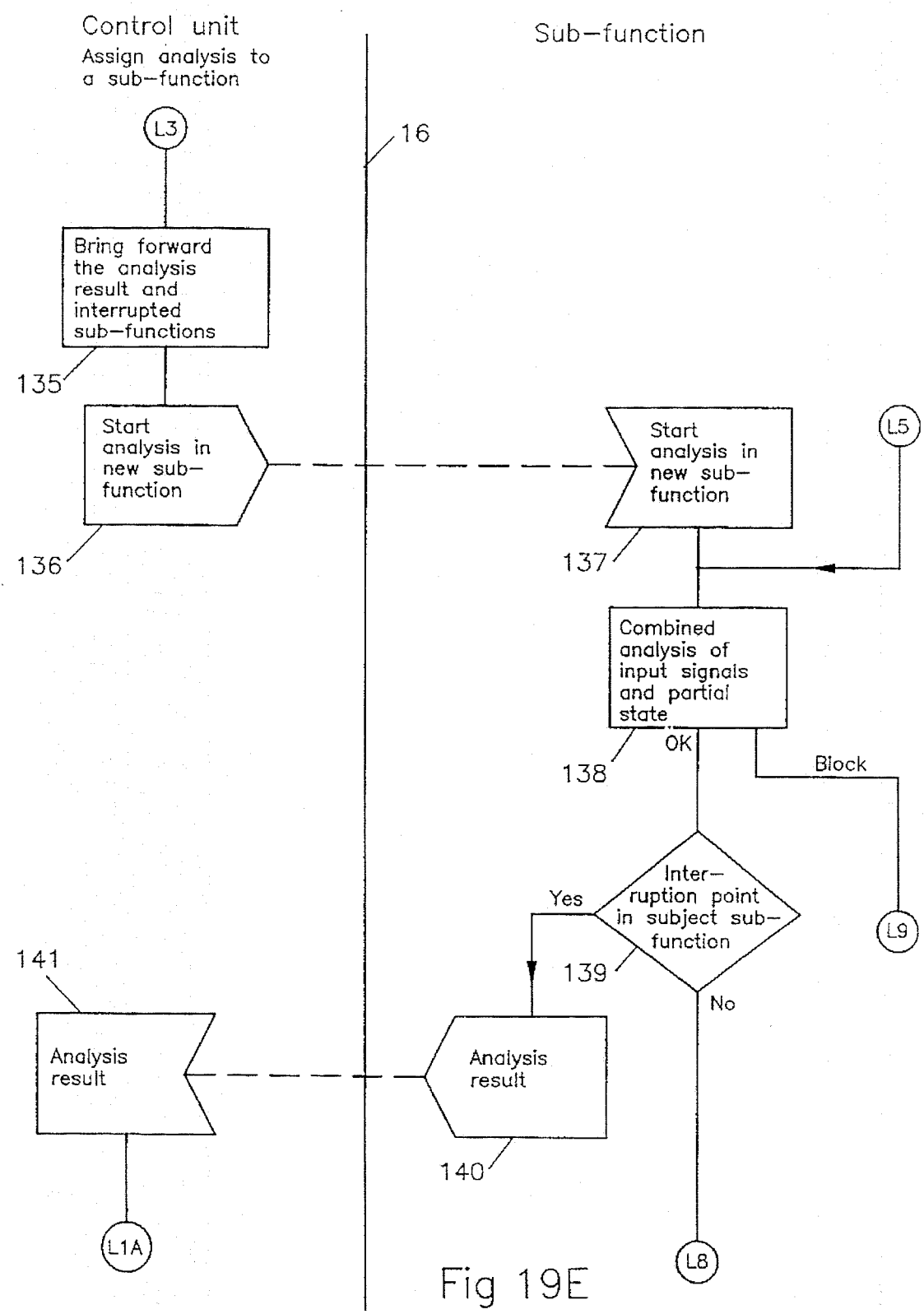

The control unit moves from block 135 in FIG. 19E to transmit a signal, block 136, to the sub-function that is interested in taking over the analysis from the subject sub-function. The interested sub-function now begins an analysis of its own, block 137, wherein the same processes as those described with reference to block 121 in FIG. 19A take place. The signal 136 corresponds to the arrow 20 in FIG. 13. When the analysis commences in the new sub-function, a combined analysis of input signal and partial state takes place, block 138. A check is made in block 139 as to whether or not the sub-function itself has a further interruption point. If so, the analysis result is sent to the control unit to be checked, block 141. Program label L1A in FIG. 19A is now reached and the same type of check as that described in conjunction with blocks 124–126 takes place. Program label L1 in FIG. 19A is reached from which a transition is made to program label L1 in FIG. 19B. The continued process from program label L1 has been described above. If the new sub-function does not have an interruption point of its own, "no" in option block 139, the program label L8, FIG. 19H, will be reached.

Consider FIG. 19B. If more than one sub-function has an interest in taking over the analysis of the subject sub-function, then the situation is a so-called interaction case and the control unit searches for the interaction function that will resolve the conflict, block 143, between those sub-functions that desire to enter the subject sub-function and interrupt the analysis. The program label L4 will now be reached and this is described in more detail below with reference to FIG. 19C. The relevant interaction function is brought forward by the control unit, block 144, by searching for the relevant combination of interacting functions among the data areas 113 (FIG. 17). When an interaction function that handles the relevant combination of interacting sub-functions is found, the control unit brings forward the interacting sub-function and its analysis result, block 145, the sub-functions that interact and relevant interaction functions, block 146. The start of an analysis in the interaction function is then initiated, block 147, by sending all collected information to the interaction function with the aid of a signal 148. The analysis is then started in the sub-function. There are now a further three cases that can occur. The interaction function can either allot priority to one of the interacting sub-functions, block 150, and the interaction function then sends a signal to the control unit. This signal sent to the control unit contains a reference to the priority allocated sub-function, block 151, whereafter the control unit moves to program label L3, as just described above. The priority allocated sub-function may now perform its own analysis, block 137.

In the second case, the interaction function can give priority of the kind that all of the interacting sub-functions are ignored and instead the analysis continues in the interrupted sub-function, block 152. Since all interacting sub-functions shall be ignored, the analysis is no longer a modifying analysis and shall continue in the interrupted sub-function. The signal sent to the control unit by the interaction function in this particular case will then contain a reference to the interrupted sub-function and program label L2 is now reached, meaning that the control unit will bring forward a list of all sub-functions that wish to perform a supplementary analysis, block 159.

In the third case, no simple priority exists between the interacting sub-functions and, in such case, the interaction function contains an analysis branch of its own. In this case, the interaction function behaves as a normal sub-function, and the interaction function then chooses a branch 154 which signifies a transition to a program label L5 located on the site shown in FIG. 19E, whereupon the analysis continues in the way described with reference to FIG. 19E. The interaction function now behaves as a normal sub-function which has been interrupted by another sub-function, and a combined analysis of input signal and partial state is commenced. Thus, similar to a normal sub-function, the interaction function may have analysis steps of its own, which in turn can be interrupted by other sub-functions. Block 155 in FIG. 19C is a standard options symbol, and in this case the options are the three aforesaid cases 150, 152, 154. If no interaction is found by the control unit at block 144, the control unit will, of course, have the possibility to make a random choice, option block 156, among the interacting sub-functions which shall be given priority over the other, block 157. It may be immaterial which of the interacting functions shall be given priority. In this case, a transition is made to program label L3 takes place, and the analysis is continued in the randomly selected sub-function, as described with reference to FIG. 19E. Alternatively, no random choice is permitted and since no interaction function is found either, it is evident that an error exists, whereupon the analysis is interrupted and an error print-out is made, block 158. The error printout includes a message to an operator informing the operator that an interaction function is lacking for the identified sub-functions.

FIG. 19D is a flow sheet illustrating the function of the control unit in a supplementary analysis process. The control unit 15 ascertains whether or not a supplementary analysis shall be performed in the interrupted sub-function, by looking in the list 111 in FIG. 17. This is shown in block 159. If sub-functions wishing to perform a supplementary analysis are found, option block 160, the first sub-function is brought forward, block 161, and a signal is sent, block 162, to this sub-function to start a sub-analysis, block 163, in the interrupting optional function. There is started therewith a new analysis branch 210 in FIG. 14B, which is branched from the original analysis sequence 220. A combined analysis of input signal and partial state is effected in the new analysis branch, block 164. When this analysis is complete, block 165, a signal to the effect that the sub-analysis has been completed is signalled to the control unit, block 166. The signal also includes the analysis result from the supplementary analysis, and this information supplements the analysis result, as shown in block 167. If several sub-functions are found in the table 111 when option block 168 is performed, the next sub-function is brought forward, block 169, and a new sub-analysis is commenced, in block 162. This means that still another new analysis branch, which is also branched from the aforedescribed original analysis sequence 220, begins at the same interruption point as the aforesaid branch 210. This is illustrated by the broken line analysis sequence 230 in FIG. 14B. If no more sub-functions wishing to perform supplementary analysis are found, a transition to program label L6 takes place. This means that the control unit reverts to the stack and brings forward the interrupted sub-function, as will be described in more detail with reference to FIG. 19F. As evident from the marking in block 164 in FIG. 19D, each new analysis branch may, in turn, contain analysis steps. Each such analysis step behaves in the same way as each other analysis step, meaning, among other things, that there may be found other sub-functions which wish to enter the new analysis branch and modify and/or supplement the analysis therein. This is not described in more detail in FIG. 19D, since a similar method has already been described with reference to FIG. 19E. If some other analysis sequence starts off its analyses before the sequence that started at block 163, said other analyses sequence will place protections on the partial states, a lockout or block occurs, program label L9, and the new analysis branch cannot continue its analysis. A lockout is always followed by a restart of the protected analysis sequence. In this case, the restart takes place from block 162 and then hopefully without the renewal of a lockout, since the previously protected partial states now have their protections removed and hopefully no other analysis sequence has started off earlier than the analysis sequence starting at block 163.

Figure 19F:
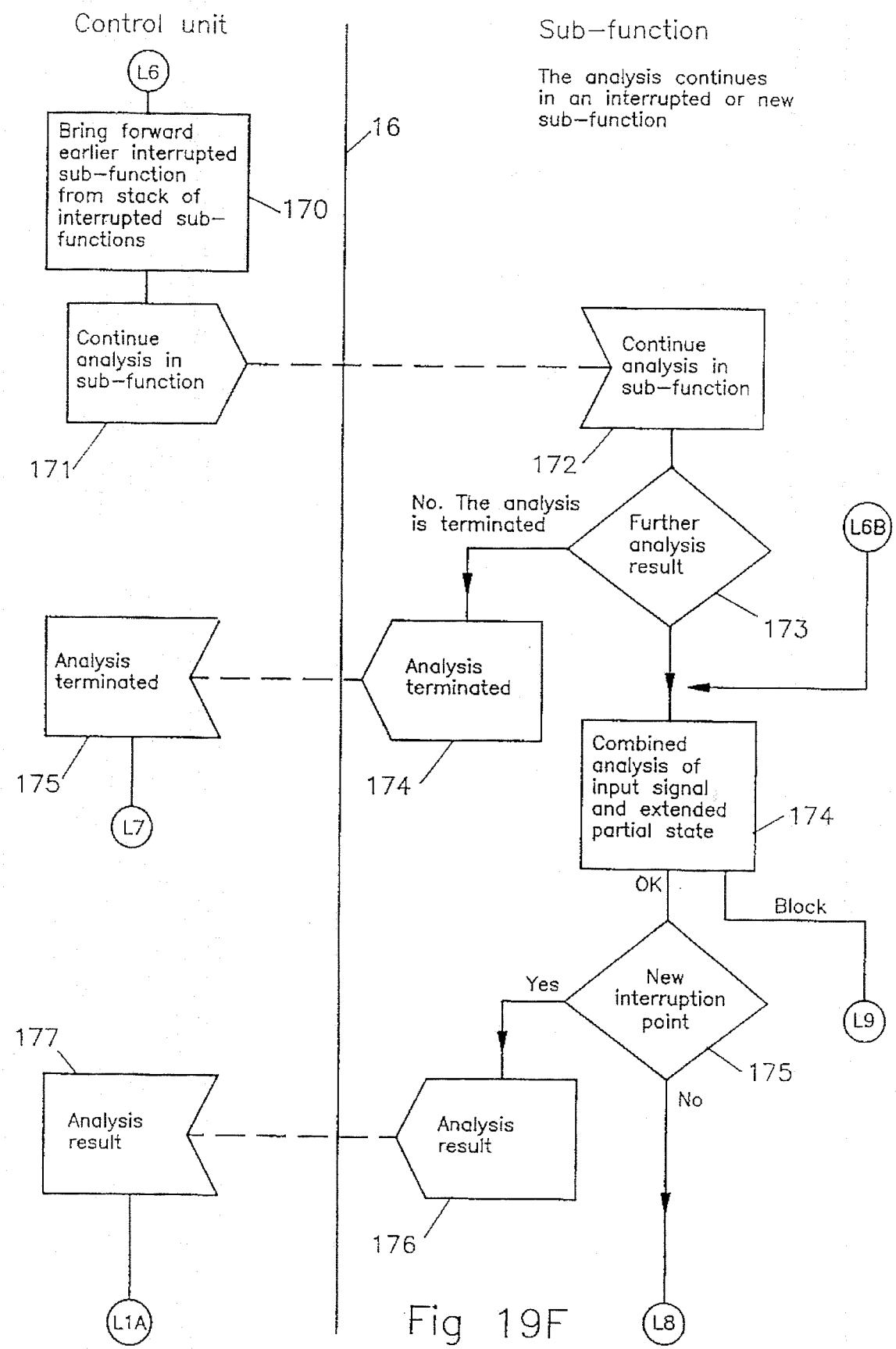

FIG. 19F shows the operation of the control unit when modifying and supplementary analysis is complete and program label L6 is reached. The earlier interrupted sub-function is brought forward from the stack of interrupted sub-functions, block 170, and the control unit sends a signal, block 171, to the earlier interrupted sub-function now brought forward that the analysis shall continue in this sub-function, block 172. The interrupted sub-function begins by checking whether or not further analysis results are to be found for collection, option block 173. If no further analysis results are found, the earlier interrupted sub-function can now draw the definite conclusion that the analysis is complete, block 174, and the sub-function signals this analysis result to the control unit. The control unit receives the signal, block 175, and now goes to program label L7. The analysis is thus ended in the interrupted sub-function, although it is not certain that all analyses are ended. If further analysis results are found, "yes" in option block 173, a combined analysis of input signal and an extended partial state is continued, block 174, and the interrupted sub-function can now have new interruption points or not, which is decided in option block 175. If new interruption points are found, "yes" in option block 175, the interrupted sub-function sends the analysis result at the new interruption point to the control unit, block 176. The control unit receives the new analysis result, block 177, and goes to program label L1A in FIG. 19A, wherein the same type of check as that described with reference to blocks 124–126 is carried out. Program label L1 in FIG. 19A is therewith reached, whereafter the process described in conjunction with FIGS. 19B, 19C, 19D and 19E is repeated.

If the interrupted sub-function has no new interruption points, alternative "no" in option block 175, program label L8 is reached.

Figure 19G:
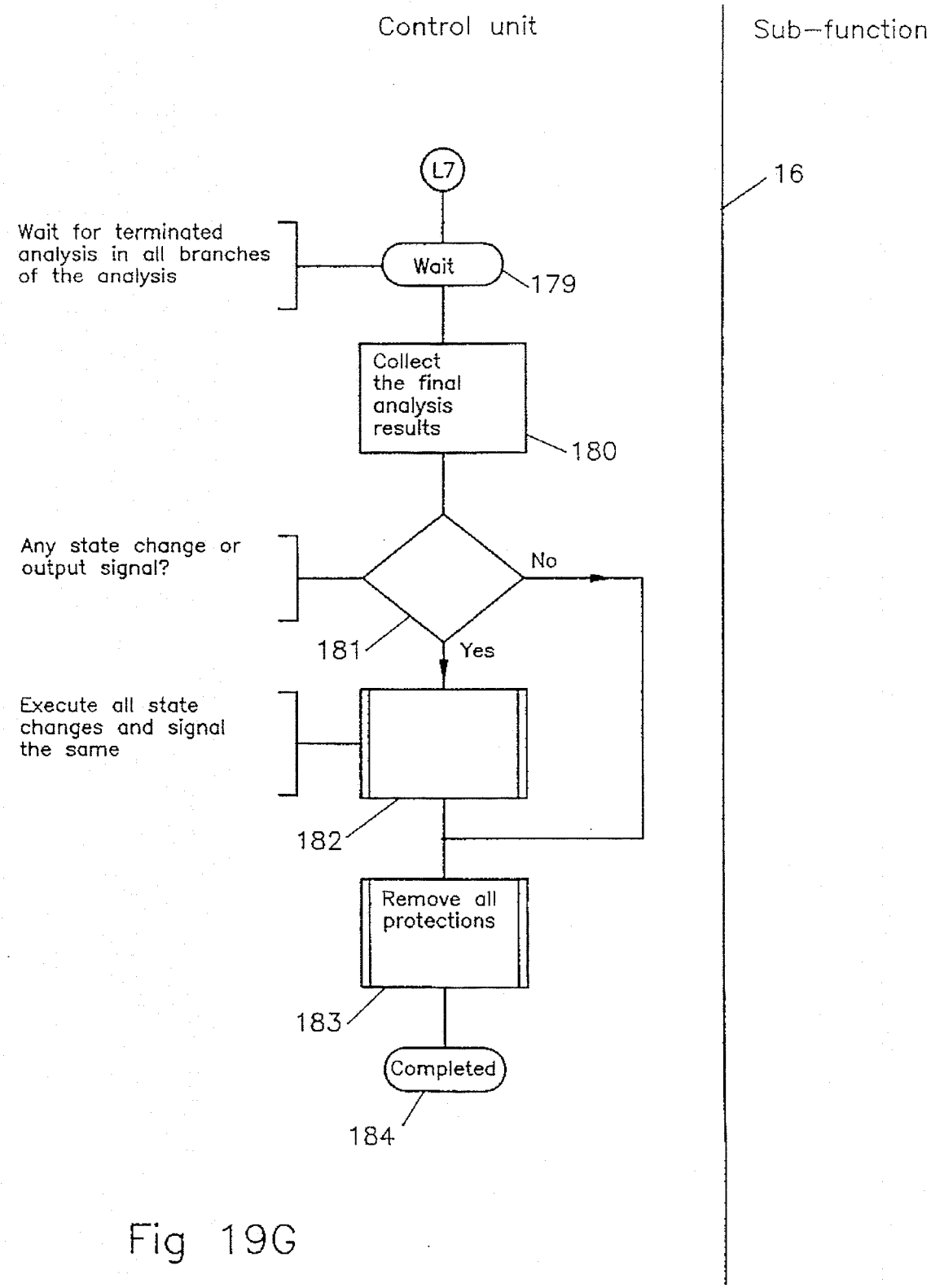

FIG. 19G describes the operation of the control unit when the analysis has been terminated in the interrupted sub-function. At this moment, the control unit is not aware whether or not the sub-function has more analysis results to present. The analysis may be distributed among several branches, as explained above. In the waiting position, block 179, the control unit waits for analyses in all analysis branches to be terminated. When the analyses in all analysis branches are terminated, the control unit collects all of the valid analysis results, block 180. These results may cause two cases to occur, namely that a state change and/or an output signal shall occur or that no state change and no output signal shall occur, i.e. that the old state shall be retained. This is decided in option block 181. If state changes are to be made, the alternative "yes" in option block 181, the operation phase 41 comes into effect and the control unit initiates the operations established during the analysis phase, these operations now performing all state changes and send all requisite signals, block 182. If no state changes are to be made, "no" in option block 181, all protections are removed, block 183, namely the protections placed on those partial states that have been the basis of the analysis. The analysis of the sub-function is now terminated, block 184, whereupon the control unit takes the aforesaid state, meaning that nothing will happen until a new input signal arrives at the device.

Figure 19H:
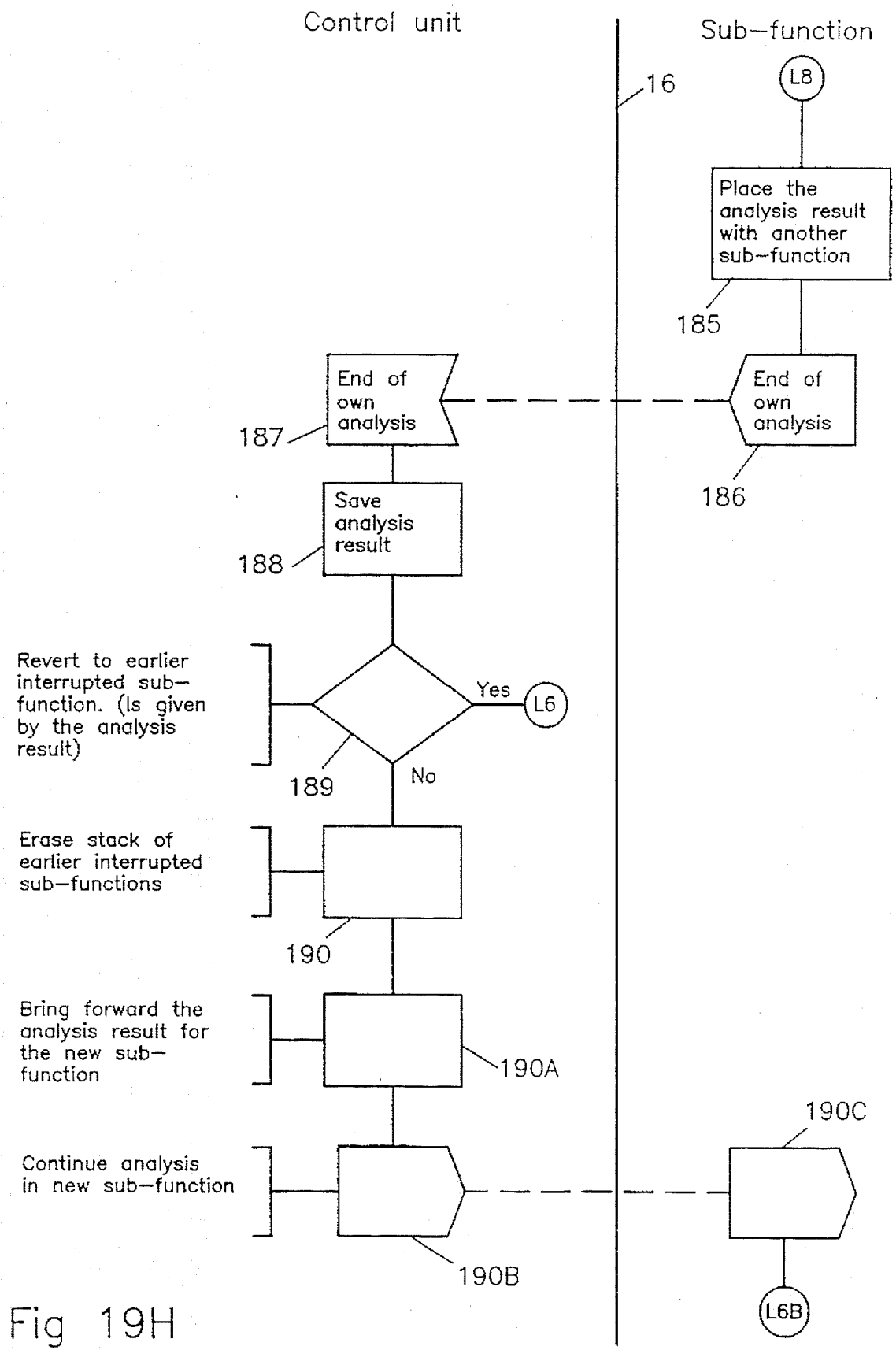
Figure 191:
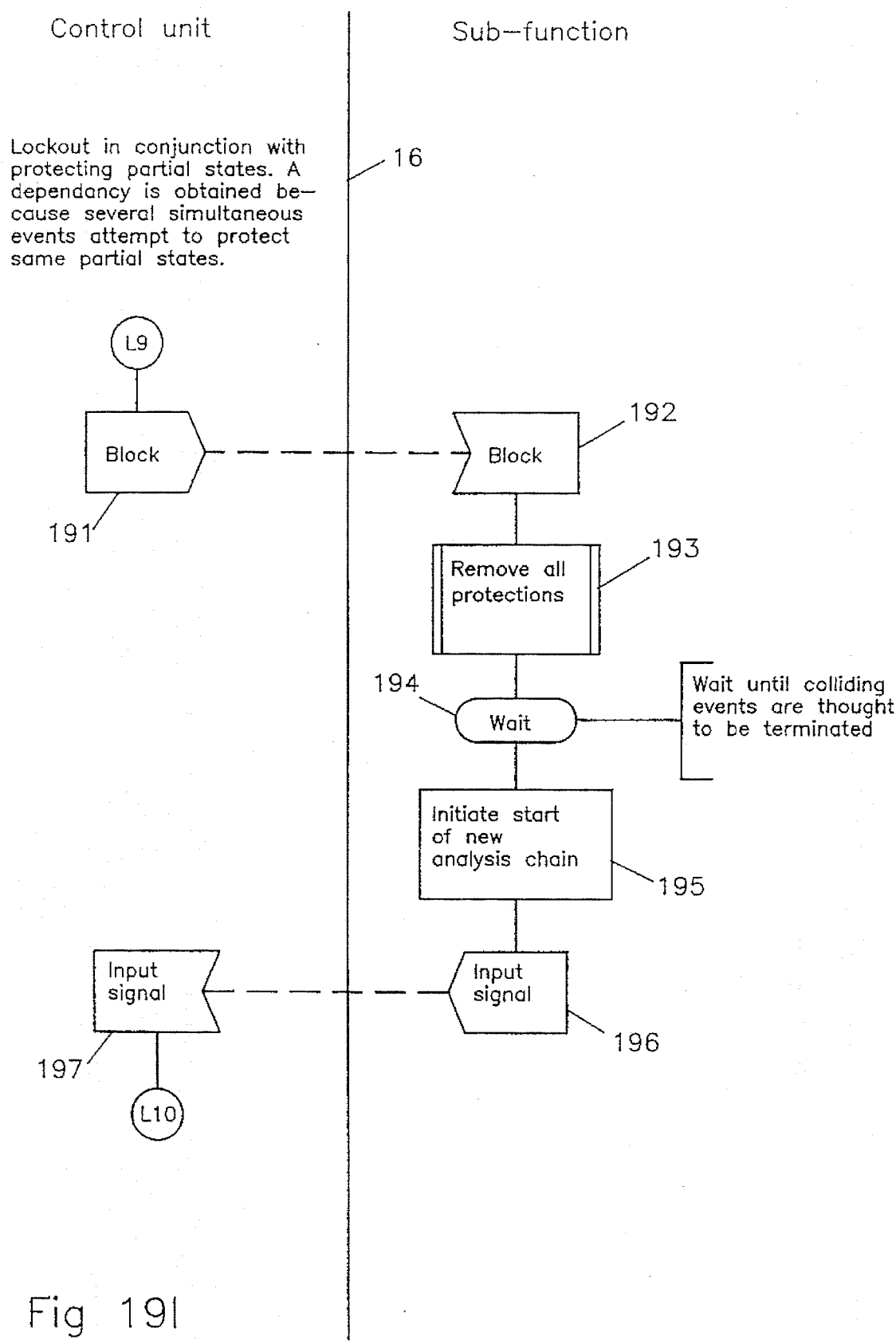

FIG. 19H shows the case in which the new sub-function described in FIG. 19F has no further interruption points and a return shall take place either to earlier interrupted sub-functions or to a completely new sub-function. The analysis result from block 174 is the analysis result that is delivered to the next sub-function, block 185, to which a transition shall be made. The analysis in the sub-function concerned is terminated, block 186, and the result of the analysis is sent to the control unit, which receives said result, block 187. The control unit saves this analysis result, block 188. The analysis result can then specify that the analysis shall be continued in another, earlier interrupted sub-function, "yes" in option block 189. This is the normal case, and a transition to program label L6 described in conjunction with FIG. 19F takes place. If the analysis result in block 188 specifies that the analysis shall be continued in a totally new sub-function, "no" in option block 189, to which the subject sub-function refers, the stack of earlier interrupted sub-functions shall be erased, block 190. The analysis results relating to the new sub-function are then brought forward, block 190A, whereupon signals are sent to the new sub-function, block 190B and 190C. A transition to program label L6B (FIG. 19F) now takes place.

FIG. 19I illustrates what occurs in program label L9, i.e. a lockout or blocking action occurs. In this case another analysis chain has already started off its analyses and has placed protections on certain pieces of data, amongst these the partial states. The manner in which protections are placed on data is known in the art. If a lockout or blocking action has occurred, block 191, the control unit sends a signal to the sub-function concerned, informing the sub-function that the analysis cannot be continued, block 192. The sub-function then removes all protections of its partial states, block 193, and reaches a waiting state, block 194. In the waiting state 194, the sub-function waits until the colliding analysis chain or chains is/are terminated and then initiates the start of a new analysis chain, block 195. A corresponding input signal is sent to the control unit, block 196. When the control unit receives this input signal, block 197, a transition to program label L10 takes place. Program label L10 is described in FIG. 19A and means that when the input signal from block 197 is received, there is started a combined analysis of input signal and partial state, block 121.

Figure 20:
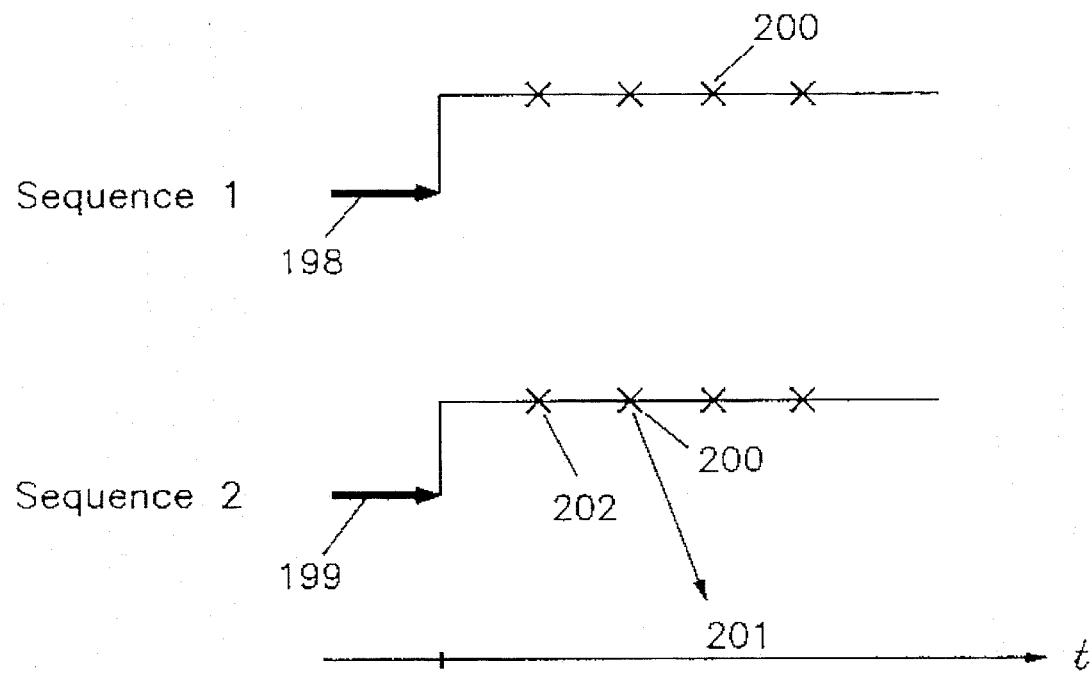
FIG. 20 is a time diagram which illustrates two simultaneously running analysis sequences with partial states that are protected successively.

FIG. 20 illustrates those events that occur when a lockout or blocking action takes place. Each of two input signals, referenced 198 and 199, starts an individual analysis sequence, reference sequence 1 and sequence 2. Each analysis sequence has a number of partial states, marked with X-signs. In each analysis sequence protections are placed on the partial states. The partial state 200 is present in both analysis sequence 1 and in analysis sequence 2. The analysis sequence 2 wants to change partial state 200 to partial state 201 and therewith comes into conflict with analysis sequence 1, which bases its analysis sequence on partial state 200. When such conflict between analysis chains occurs, it is necessary to stop at least one of the analysis chains and, for instance, begin from the beginning after a certain time delay.

EXAMPLE

The attached program listing illustrates the implementation of a device and its control unit. The device is a program-controlled telephone exchange which has a basic function telephony, POTS, and a number of optional functions, interaction functions and an interface function. The experiment has been carried out with the sub-functions in a laboratory and all sub-functions were found to operate satisfactorily. The program language used was ERLANG, which is a process directed language developed by Applicant's colleagues. Armstrong, J. L. and Virding, S.R., "Erlang an Experimental Telephony Programming Language", XIII International Switching Symposium—Stockholm, Sweden. May 27–Jun. 1, 1990. The enclosed program listing is not self-supporting, but is based on certain older experiments which were carried out with an older control unit and a special access-control-unit of slightly different design. In order for the program listing to be self-supporting, further work is required with converting terms from the older control unit and the older access-control-unit.

The name conventions used in the program listing and appearing uppermost on each page are as follows:

Name_er1 denotes a "normal options function", Name_dts.er1 denotes the optional function "Name" in an access with a digital telephone. Name1_and_ name2 denotes an interaction function for Name1 and Name2. Name_interface denotes an interface function with the name "Name".

The code listing for the control unit 15 is given on pages 1–9 of the document date stamped 91-10- 11. The program listing defs.er1 of the document date stamped 91-09-19 describes a number of common sub-functions. This is followed by a number of connectable optional functions. The optional function a_number_ transmission.er1 denotes transmission of the A-number to the B-side. This is a known optional function.

The optional function b_number_ transmission.er1 is a service or sub-function found in telephony which means that it is the true B-number that is transmitted to the A-side and not the number that is dialled by the A-subscriber. Thus, if a diversion follow-me has been requested by the B-side, the number to which the call has been diverted is shown on the telephone display of the A-subscriber.

The optional function b_number_transmission _dts.er1 date stamped 91-10-10 describes the same event as the preceding optional function, with the addition that this program section includes the part that is occasioned by the A-subscriber having a digital telephone instead of an analog telephone. Analog telephones do not normally have a display. This optional function is thus dependent on the type of telephone set used. The optional function black_list-er1 date stamped 91-08-09 denotes an optional function which blacklists calls from predetermined telephone numbers. This optional function can be used to prevent the connection of calls from undesirable people.

The optional function black_list_and _diversion.er1 is an interaction function which enters into force when the optional function black_list is activated at the same time as the optional function diversion follow-me, is activated. In this case, the interaction function has been structured so that the optional function black_list will obtain priority over the diversion function. This means that if the B-subscriber has activated a diversion follow-me to a diversion number, the blacklisted A-subscribers will not be able to reach the diversion number, i.e. the telephone on the diversion number is protected against calls from the blacklisted subscribers.

The optional function call_back.er1 is a conventional call-back function.

The optional function call_back_dts.er1 is that part of the call-back function occasioned by the use of a digital telephone.

The optional function conference.er1 enables conference calls to be set-up. The A-subscriber calls the B-subscriber, whereafter the parties are in agreement that a conference shall be held with a third party C. The A-subscriber parks the B-subscriber and rings C and asks whether C will participate in the conference. If C says yes, the A-subscriber dials a code and the parties A, B and C meet in a telephone conference.

The optional function conference_suppl.er1 is a modified form of the optional function conference.er1. When the A-subscriber and the B-subscriber agree that C shall be contacted, the B-subscriber remains in the call state while the A-subscriber calls C and asks C to participate in the conference. The conference is therewith begun.

The optional function delete_feature.er1 is a sub-function with which it is discovered when dialling a telephone number that the last digit is wrong, the last digit can be deleted and a new digit then inserted. This optional function can be combined with the aforedescribed option b_number-transmission_ dts.er1, wherein it can be seen on the telephone display how the digit last inserted is erased. The optional function delete-feature.er1 also enables a subscriber to first ring a B-subscriber and then retract, i.e. annul, the call and renew the call with the correct B-number.

The code listing delete_feature_dts.er1 is the same function as that described above, but with the additional code that is required when the subscriber has a digital telephone.

The optional function diversion.er1 is a diversion follow-me or follow-me diversion option.

The optional function diversion_on_busy _er1 means diversion of a call when busy.

The optional function diversion_suppl.er1 is a new sub-function so designed that when the B-subscriber has activated a diversion option, those telephone numbers to which the diversion is directed will appear on the A-subscriber display. The A-subscriber is now able to control from its own either to accept the call to the diversion connection or to change the call to the original number.

The optional function diversion_time out er1. is a sub-function which involves a diversion connection in the absence of a reply.

The optional function emergency_centre.er1 means that the B-subscriber can maintain a connection even when the A-subscriber goes on-hook. This enables the call to be traced.

The optional function free_on_second_line_dts.er1 solely applies to digital telephones. The basic function is so defined that only one call can be taken on the same telephone, although when selecting this function free_on_second_line_ dts.er1, it is possible to receive another call on the same telephone, but on another access thereto. The rules which state when the digital telephone receives a call on either access can be changed, by choosing to place this sub-function as an optional function implemented in the form of software. In other words, a greater degree of freedom is afforded with regard to the design of the optional function.

The optional function hot_number.er1 is a sub-function which causes a predetermined number to be called automatically when the receiver is lifted from the telephone set. The predetermined number is programmed in the optional function as the function is connected.

The optional function intrusion.er1 is a sub-function which enables a subscriber having this sub-function activated to interrupt an ongoing call and leave a message of the kind "It's me, XX calling, please call me on number 12345". This is normally a sub-function that is used by telephone operators.

The optional function intrusion_dts.er1 is the same function as that described above, but includes supplements that are required when the option is used in conjunction with a digital telephone.

The optional function parking.er1 enables an ongoing call to be parked in order, for instance, to initiate a new call.

The optional function parking_dts.er1 is the same function as that described above, but includes the additional program steps required when the telephone concerned is a digital telephone.

The optional function pick-up.er1 is a function which if the usual telephone of the B-subscriber rings and: (a) the B-subscriber is not in the same room as the usual telephone and (b) the B-subscriber is in an adjacent room in which he hears his usual telephone ring and in which another telephone is found, the B-subscriber is able to lift the receiver of the telephone set in the room in which he is located and dial a code and then transfer the call to the last-mentioned telephone.

The next optional function, pick-up_dts.er1 is the same function as that described above and includes a program listing for the case when the B-subscriber has a digital telephone.

The next optional function, pots.er1, is the basic function POTS, i.e. Plain Ordinary Telephone Service. It should be noted that as a result of the division proposed in accordance with the invention, the basic function telephony can be implemented in code form in a surprisingly simple fashion.

The optional function pots_dts.er1 is the same basic function as that described above, although this function is supplemented with those program listings required when a subscriber has a digital telephone.

The optional function short_number.er1 is the conventional short number service.

The optional function subscriber_service_interface.er1 is an interface function which contains a number of interruption points that are common to the group of subscriber services on the one hand and the group of administrative services on the other. Among these interruption points is marked one designated "initiate_ feature_attempt".

The group of administrative services includes, among other things, the service subscriber_maintenance.er1, which is a very simple administrative service used to connect subscriber services. The program set "initiate_ feature (Feature A_no.) connects an individual subscriber service, more specifically the service named Feature. This service shall be connected for a given A-subscriber having the telephone number A_no. This service subscriber_maintenance.er1 has an own interruption point initiate_feature_attempt and, for instance, if the subscriber service diversion is to be activated, at the A-subscriber, this service is named or identified together with certain other parameters, thereamong the A-number. When the administrative service wishes to initiate diversion for the named subscriber, the interface function will wish to take over continued execution of the administrative service subscriber_maintenance when the interruption point initiate_feature_attempt is reached. The interface function is not aware of the existence of the service "diversion". On the other hand, the control unit has information relating to those services that are potentially interested in entering and interrupting and taking over the analysis at the interruption point initiate_feature_attempt and therefore goes out to the individual services in this group of potentially interested services and enquiries which of the services may be interested in being connected. The service in the group of subscriber services which recognizes the service called Feature, in this case the service diversion, referred to as the subject function, takes charge of the function called initiate_feature_ attempt from the interface function and sees, after analysis in the subject function, that subscriber A is not connected. The optional function subscriber_maintenance.er1 then requests connection of "diversion" on the A-subscriber with the given A-number, and when this has been effected reports back to the subscriber service that a successful connection attempt has been made. In principle, the sub-function diversion then effects a change of the partial state, i.e., in principle, the subscriber service says that the diversion service on the given A-number has been connected from this moment. The output signal from the subscriber service diversion constitutes an acknowledgement to the network operator that the connection is finalized.

The optional function subscriber_statistics.er1 is a statistic function which is an example of an optional function that supplements the analysis in a modifying optional function without influencing the analysis sequence in the latter.

The optional function transfer.er1 is a transport function, i.e. when subscriber K rings subscriber A and subscriber A then calls another subscriber B, for instance with a query, subscriber A can then replace his receiver, i.e. go on-hook and subscriber K is then connected with subscriber B and subscriber A is released.

The optional function transfer_dts.er1 is the same function as that described above, with those additions that are required when the subscriber has a digital telephone.

The optional function warm_number is a function which means that a predetermined number is called after a predetermined period of time, for instance five seconds, has lapsed without a digit having been received. The optional function is similar to the hot-number function which is obtained immediately the receiver is lifted.

I claim:

1. A method of dividing the function of a device into a number of sub-functions, preferably the manner of operation of a telecommunication device into a number of sub-services, comprising the steps of:

dividing the function so that each sub-function will correspond to the smallest functional unit that can be added to or removed from the device, and identifying the logic dependencies that exist between the sub-functions that have been divided in the aforesaid manner, each set of sub-functions that meets the requirements of the identified dependencies of the sub-functions thus forming a potential set of sub-functions for a device, therewith facilitating both the reuse of sub-functions between devices and the supplementation of existing devices with new sub-functions.

2. A method according to claim 1, wherein said the logical dependencies include, identifying:

(a) when the performance of a sub-function requires one or more specific other sub-functions; and (b) when the performance of a sub-function requires at least one sub-function selected from a group of specific other sub-functions.

3. A method according to claim 1, wherein the following applies for each potential set of sub-functions for a device:

(a) the set describes a number of possible states that the device can reach, these states, in turn, including in general a collection of mutually related components, each of said components being called a partial state;

(b) for each state, there exists a number of possible external stimuli and a number of potential external responses;

(c) a number of predefined operations exist which are either defined locally in a sub-function or applied to all sub-functions, wherein a predefined operation may have parameters and cause a predetermined change in a partial state or produce a predetermined external response;

(d) for each combination of partial state and external stimuli, there exists a process which:

(i) generates a new partial state or, depending on the combination concerned, retains the same partial state; and (ii) generates at least one external response or, depending on the combination concerned, does not generate an external response, said method comprising the steps of dividing each process into an analysis phase and an operation phase, the result of the analysis phase indicating either (a) that the partial state shall be changed, the analysis result then stating those operations that bring about the new partial state; or (b) that the partial state shall be kept unchanged, the result of the analysis phase for each case (a) and (b) stating that:

(c) at least one external response shall be given, wherein the analysis result states those operations that generate said external response; or (d) that no external response shall be given; and starting the operation phase not until the analysis phase has been terminated.

4. A method according to claim 3, wherein the analysis phase begins with an external stimulus, said method comprising steps of performing said analysis in an ordered sequence of steps each step producing at least one analysis result; and starting said analysis in that sub-function which is associated with said external stimulus and continuing the analysis in this sub-function either until the analysis is terminated, or is continued in a sequence of sub-functions, although always in one sub-function at a time, until the analysis is terminated.

5. A method according to claim 4, wherein said ordered sequence of analysis steps being called an analysis branch and the analysis branch in which the analysis starts being called the main branch wherein a service provider in a sub-function, separate from the sub-function in which analysis in the main branch is in progress, has the option to start, in each analysis step in the main branch at least one analysis sub-branch, provided that those operations established as the result of analysis in a sub-branch are not in conflict with an operation in the main branch or with any operation in any other sub-branch.

6. A method according to claim 5, wherein the analysis in an analysis sub-branch is performed in a sub-function other than the sub-function in which the main branch starts, or in a sequence of other sub-functions which are different from the sub-function in which the main branch starts.

7. A method according to claim 5, wherein said analysis in said main branch is based on successively increasing sets of partial states and the analysis result in a later analysis step is based on a set of partial states of earlier steps, thereby unambiguously establishing the sequence of analysis steps.

8. A method according to claim 7, in which a sub-function that requires no other specific sub-function is called the base function, and a sub-function which requires a specific other sub-function or several specific other sub-functions is/are called optional functions, wherein the aforesaid division results in that the base function is unable to refer to a sub-function; and in that an optional function can refer to solely specific other sub-function or those specific other sub-functions required by said optional function.

9. A method according to claim 8, in which the sub-function is a base function to which other sub-functions are allowed to refer, and in which a base function has partial states of its own, wherein an analysis branch is started by either an external stimulus which is associated to the base function and/or an analysis branch that has already started continues in the base function, said base function performing in both cases a sequence of analysis steps in one main branch and resulting in at least one analysis result after each such analysis step, each analysis result presenting an interpretation of relevant stimulus in combination with relevant states, and terminating the analysis phase at the end of the sequence, there having been established a specific number of operations which shall be performed during the following operations phase.

10. A method according to claim 9, wherein when an analysis branch that has already been started continues in the base function, said base function taking over the earlier analysis result from the analysis branch.

11. A method according to claim 10, in which the sub-function is an optional function, and in which the optional function has partial states of its own, which are linked to partial states of those sub-functions to which the optional function refers, wherein the optional function starts an analysis sequence of its own either by an external stimulus which is bound to the optional function and/or, an analysis branch that has already started continues in the optional function, the optional function performing in both cases a sequence of analysis steps in the own optional function, and that at least one analysis result is obtained after each such analysis step and, provided that predetermined conditions are fulfilled, the optional function being intended to take over the analysis after a specific number of steps in another sub-function to which the optional function refers, and that the analysis phase terminates either in the optional function itself or continues in another sub-function to which the optional function refers, wherein in this latter case the result of the analysis in the own optional function is transferred to the analysis in the referred sub-function as first analysis result.

12. A method according to claim 11, wherein in order to establish whether or not the predetermined conditions are fulfilled, there is carried out a check which may include the partial states of the optional function, the partial states of the sub-function or sub-functions to which the optional function refers, and the analysis results that have hitherto been obtained.

13. A method according to claim 12, wherein when the optional function takes over the analysis, the analysis branch relevant to the optional function continues in the optional function itself and with respect to its own partial states.

14. A method according to claim 13, wherein the result of the analysis in the analysis sequences of the optional function modifies the analysis result of said step in the sub-function from which the optional function took over the analysis; and wherein the optional function passes the continued analysis to that sub-function from which the optional function took the analysis.

15. A method according to claim 14, wherein the optional function starts a new analysis branch from a predetermined analysis step in a sub-function to which the optional function refers for supplementing the analysis in the sub-function referred to.

16. A method according to claim 15, comprising the steps of forming a special type of optional functions, called interaction functions, which are designed to resolve those conflict situations that occur when at least two optional functions wish to take over the analysis simultaneously subsequent to checking the analysis take-over conditions.

17. A method according to claim 16, wherein the interaction function is designed to resolve all conflicts that occur, (i) between a specific group of optional functions to which the interaction function refers, or (ii) between several groups of optional functions to which the interaction function refers.

18. A method according to claim 17, wherein an interaction function resolves the aforesaid conflict either by: (i) pointing out one of the optional functions that are in conflict with each other and assigning the analysis to said one optional function, or (ii) deciding that none of the optional functions that are in conflict with each other shall be allowed to take over the analysis, and to decide that the analysis shall continue in the sub-function to which he conflicting functions refer; or (iii) said interaction function itself takes over the analysis.

19. A control system for dividing the function of a device into a number of sub-functions preferably the manner of operation of a telecommunication device into a number of sub-services, comprising:

means for dividing the function so that each sub-function will correspond to the smallest functional unit that can be added to or removed from the device, means for identifying the logic dependencies that exist between the sub-functions that have been divided in the aforesaid manner, each set of sub-functions that fulfills requirements that are a consequence of the identified dependencies of the sub-functions thus forming a potentially possible set of sub-functions for a device, therewith facilitating both the reuse of sub-functions between devices and the supplementation of existing devices with new sub-functions, and a unitary interface for activating a sub-function, referred to as the subject sub-function below, said interface comprising, (i) a reference to the subject sub-function, and (ii) information relating to analysis steps within the subject sub-function and in which other sub-functions are able to interrupt the subject sub-function.

20. A control system according to claim 19, wherein said interface includes references to other sub-functions as well as analysis steps therein in which subject sub-function wishes to start a sub-analysis branch or supplementary analysis.

21. A control system according to claim 20, wherein the subject sub-function is an optional function, and said interface includes references to all sub-functions required by the optional function.

22. A control system according to claim 21, wherein said interface includes references to such other sub-functions and analysis steps therein in which the subject sub-function itself is potentially interested in interrupting the analysis in order to modify said analysis.

23. A control system according to claim 22, wherein the subject sub-function is an interaction-type optional function, and said interface includes references to interacting sub-functions whose mutual conflict can be resolved by said interaction function.

24. A control system according to claim 23, wherein a reference refers (i) to a specific group of optional functions; or (ii) to several groups of optional functions.

25. A control system according to claim 24, including means for checking, after each analysis step that ends in a sub-function, whether or not there exists some other sub-function that is potentially interested in taking over the analysis.

26. A control system according to claim 25, wherein for each sub-function potentially interested in taking over the analysis said control means assigns to the potentially interested sub-function the function of checking whether or not the condition for taking over the analysis specified in the sub-function are fulfilled, wherein said conditions may include: (i) checking the partial states of the potentially interested sub-function, (ii) checking the partial states in those sub-functions to which the potentially interested sub-function refers; and (iii) checking earlier obtained analysis results.

27. A control system according to claim 26, wherein when no sub-function wishes to take over the analysis, said control means orders the analysis to continue in the next step of the analysis sequence in the sub-function in which the analysis is in progress.

28. A control system according to claim 27, wherein when a sub-function wishes to take over the analysis, said control means temporarily stops the analysis in the sub-function in which the analysis is in progress and orders the analysis to continue in the sub-function that wishes to take over the analysis.

29. A control system according to claim 28, wherein when more than one sub-function wishes to take over the analysis, said control means (i) collects a reference to the interaction function that deals with the conflict in question; and (ii) assigns the analysis to this interaction function.

30. A control system according to claim 29, wherein after each analysis step said control means checks whether a sub-function wishes to start a new analysis branch, and if, so causes the control system to initiate the start of a new analysis branch for each such sub-function.

31. A control system according to claim 30, wherein subsequent to termination of the analysis in the analysis branch of a sub-function, said control means, depending on the result of the sub-function analysis, (1) terminates the analysis in the sub-function branch concerned or (2) returns the analysis to an earlier interrupted sub-function or (3) continues the analysis in another sub-function.

32. A control system according to claim 31, comprising means for monitoring the termination of analyses in all analysis branches; and means for initiating the start of the operation phase in response to the monitoring means signalling the termination of analyses; the operations finally established during the analysis phase and distributed to a number of sub-functions being executed by the control system during the operation phase.

33. A method of dividing the function of a device into a number of sub-functions preferably the manner of operation of a telecommunication device into a number of sub-services, comprising the steps of:

dividing the function so that each sub-function will correspond to the smallest functional unit that can be added to or removed from the device, identifying the logic dependencies that exist between the sub-functions that have been divided in the aforesaid manner, and arranging the sub-functions into individual sets of sub-functions according to their identified dependencies thus forming potentially possible sets of sub-functions for a device, therewith facilitating both the reuse of sub-functions between devices and the supplementation of existing devices with new sub-functions.

* * * * *